United States Patent
Sillard et al.

(10) Patent No.: US 10,007,055 B2
(45) Date of Patent: Jun. 26, 2018

(54) FEW MODE OPTICAL FIBER LINKS FOR SPACE DIVISION MULTIPLEXING HAVING TRENCHED FIBERS WITH HIGH LEAK LOSSES FOR LEAKY MODES AND LOW BEND LOSSES

(71) Applicant: DRAKA COMTEQ BV, Amsterdam (NL)

(72) Inventors: Pierre Sillard, Le Chesnay (FR); Denis Molin, Draveil (FR); Marianne Bigot-Astruc, Janvry (FR)

(73) Assignee: Draka Comteq B.V., Amsterdam (NL)

( * ) Notice: Subject to any disclaimer, the term of this patent is extended or adjusted under 35 U.S.C. 154(b) by 0 days. days.

(21) Appl. No.: 15/023,126

(22) PCT Filed: Sep. 20, 2013

(86) PCT No.: PCT/IB2013/002413
§ 371 (c)(1),
(2) Date: Mar. 18, 2016

(87) PCT Pub. No.: WO2015/040447
PCT Pub. Date: Mar. 26, 2015

(65) Prior Publication Data
US 2016/0231503 A1    Aug. 11, 2016

(51) Int. Cl.
*G02B 6/028*    (2006.01)
*G02B 6/036*    (2006.01)
(Continued)

(52) U.S. Cl.
CPC ....... *G02B 6/0288* (2013.01); *G02B 6/02214* (2013.01); *G02B 6/0365* (2013.01);
(Continued)

(58) Field of Classification Search
CPC .. G02B 6/02; G02B 6/02023; G02B 6/02214; G02B 6/028; G02B 6/0288; G02B 6/036;
(Continued)

(56) References Cited

U.S. PATENT DOCUMENTS

| 7,187,833 | B2* | 3/2007 | Mishra | G02B 6/02014 |
| | | | | 385/126 |
| 7,406,237 | B2* | 7/2008 | Bickham | G02B 6/02223 |
| | | | | 385/123 |

(Continued)

FOREIGN PATENT DOCUMENTS

| WO | 2011/094400 A3 | 4/2011 |
| WO | 2012/161809 A1 | 11/2012 |
| WO | 2013/126254 A1 | 8/2013 |

OTHER PUBLICATIONS

International Preliminary Report on Patentability for PCT/IB2013/002413 dated Mar. 22, 2016 (8 pages).

(Continued)

*Primary Examiner* — Andrew Jordan
(74) *Attorney, Agent, or Firm* — Shumaker, Loop & Kendrick, LLP

(57) ABSTRACT

The invention relates to an optical link comprising N optical fibers, with N≥2. Each optical fiber comprises an optical core and an optical cladding surrounding the optical core, the optical core having a single $\alpha_i$ graded-index profile with $\alpha_i \geq 1$, and the optical core having a radius $R_{1i}$, where i E [1; N] is an index designating said optical fiber. Said optical cladding comprises a region of depressed refractive index $n_{trench i}$, called a trench, surrounding the optical core. According to embodiments of the invention, for all optical fibers in said link, said optical core radius $R_{1i}$ and said length $L_i$ are chosen such that $R_{1i} \geq 13.5$ μm and so as to satisfy a criterion C of quality. Thus, the invention provides a few-mode optical fiber link, which allow guiding an increased number of LP modes as compared to prior art FMF links, while reaching low Differential Mode Group Delay.

12 Claims, 6 Drawing Sheets

(51) Int. Cl.
*H04J 14/00* (2006.01)
*H04J 14/04* (2006.01)
*G02B 6/02* (2006.01)

(52) U.S. Cl.
CPC .......... *G02B 6/03627* (2013.01); *H04J 14/00* (2013.01); *H04J 14/04* (2013.01); *G02B 6/02023* (2013.01)

(58) Field of Classification Search
CPC ... G02B 6/03627; G02B 6/0365; H04J 14/00; H04J 14/04
See application file for complete search history.

(56) References Cited

U.S. PATENT DOCUMENTS

| | | | | |
|---|---|---|---|---|
| 8,995,803 | B2* | 3/2015 | Bickham | G02B 6/268 385/27 |
| 9,470,841 | B2* | 10/2016 | Bickham | G02B 6/02042 |
| 9,559,782 | B2* | 1/2017 | Koebele | H04B 10/2581 |
| 9,638,856 | B2* | 5/2017 | Sillard | G02B 6/0288 |
| 2007/0196061 | A1* | 8/2007 | Bickham | G02B 6/02223 385/123 |
| 2012/0328255 | A1* | 12/2012 | Bickham | G02B 6/02019 385/124 |
| 2013/0071114 | A1* | 3/2013 | Bickham | G02B 6/0288 398/44 |
| 2013/0071115 | A1* | 3/2013 | Bennett | H04B 10/2581 398/44 |
| 2013/0216181 | A1* | 8/2013 | Bickham | G02B 6/268 385/28 |
| 2014/0126588 | A1* | 5/2014 | Koebele | H04B 10/2581 370/542 |
| 2015/0160408 | A1* | 6/2015 | Bickham | G02B 6/02042 385/124 |
| 2016/0223743 | A1* | 8/2016 | Sillard | G02B 6/0288 |
| 2016/0261344 | A1* | 9/2016 | Zhang | H04B 10/2543 |

OTHER PUBLICATIONS

International Search Report for PCT/IB2013/002413 dated Mar. 25, 2014 (2 pages).

* cited by examiner

FEW MODE OPTICAL FIBER LINKS FOR SPACE DIVISION MULTIPLEXING HAVING TRENCHED FIBERS WITH HIGH LEAK LOSSES FOR LEAKY MODES AND LOW BEND LOSSES

CROSS-REFERENCE TO RELATED APPLICATION

This 35 U.S.C. § 371 U.S. National Stage Patent Application claims priority from PCT/IB2013/002413 filed Sep. 30, 2013, the entirety of which is incorporated herein by reference.

1. FIELD OF THE INVENTION

The invention relates to the field of fiber optic transmission, and, more specifically, to improved few-mode optical fiber links for space division multiplexing.

2. BACKGROUND

An optical fiber is conventionally constituted of an optical core, which transmits an optical signal, and of an optical cladding, which confines the optical signal within the optical core. To that end the refractive index of the core, $n_c$, is greater than the one of the cladding, $n_{Cl}$. An optical fiber is generally characterized by a refractive index profile that associates the refractive index (n) with the radius (r) of the optical fiber: the distance r with respect to the center of the optical fiber is shown on x-axis and the difference Dn between the refractive index at radius r, n(r), and the refractive index of the optical cladding $n_{Cl}$ is shown on y-axis.

Nowadays, two main categories of optical fibers exist: multimode fibers and single-mode fibers. In a multimode fiber, for a given wavelength, several optical modes are propagated simultaneously along the optical fiber, whereas in a single-mode fiber, the higher order modes (hereafter called HOMs) are cut-off or highly attenuated.

Single-mode fibers are commonly used for long-distance applications, such as access networks or metropolitan networks. To obtain an optical fiber capable to transmit a single-mode optical signal, a core with a relatively small diameter is required (typically between 5 μm and 11 μm). To meet requirements of high speed or bit-rate applications (for example 10 Gbps), standard single-mode fibers require use of a modulated single-mode laser emitter tuned to work typically at a wavelength of 1550 nm. However, single-mode fibers suffer from nonlinearly problems, which are major limitations on fiber transmission capacity.

Multimode fibers are commonly used for short-distance applications requiring a high bandwidth, such as local area networks (LANs) and multi-dwelling units (MDUs), more generally known as in-building networks. The core of a multimode fiber typically has a diameter of 50 nm, or 62.5 μm. The most prevalent multimode fibers in telecommunications are the refractive graded-index profile optical fibers. By minimizing the intermodal dispersion (i.e. the difference between the propagation delay times or group velocity of the optical modes along the optical fiber, also called DMGD for Differential Mode Group Delay), such a refractive index profile guarantees a high modal bandwidth for a given wavelength. However, such fiber designs unfortunately enhance modal coupling, which impedes the use of multimode fibers in the long distance communication scenario.

Since data traffic over fiber optic networks continues to grow exponentially, there is an increasing demand for increasing per-fiber traffic particularly across long distances. To this end, multiplexing techniques have been developed that allow a plurality of separate data streams to share the same optical fiber. Among these techniques, one promising approach is space division multiplexing (SDM), in which a plurality of data channels within a single optical fiber are provided by a respective plurality of optical signal modes guided by the fiber.

Such a technique has required the development of new types of optical fibers, called few-mode optical fibers, which support more than one spatial mode but fewer spatial modes than the multi-mode fibers. Such few-mode fibers, which are notably disclosed in the PCT patent document WO2011/094400, support approximately 2 to 50 modes. They can be configured so as to not have the modal dispersion problems that occur in multi-mode fibers.

Space-division-multiplexed transmissions using Few-Mode Fibers (FMFs) have hence recently received considerable attention because of their potential to multiply the capacity of single-mode transmissions by the number of modes that will be used.

One approach to the design of Few-Mode Fibers consists of minimizing the Differential Mode Group Delays (DMGDs, i.e. the difference in the respective arrival times of the guided modes used for spatial multiplexing), so that all modes can be simultaneously detected using complex 2N×2N (N being the total number of spatial modes, i.e. including LP (Linear Polarization) mode degeneracies) MIMO techniques, regardless mode-coupling phenomena that is one of the limiting factor to bridge long distances. This optimization, however, becomes more and more difficult when the number of LP modes increases.

It has to be noted, however, that less complex MIMO techniques may be used by grouping LP modes having close effective index differences, and detecting groups of LP modes, instead of individual LP modes.

A first known solution is disclosed in the US 2013/0071114 patent document, which describes a few mode optical fiber suitable for use in a mode division multiplexing optical transmission system. Such an optical fiber has a single alpha graded-index core with a radius $R_1$ (with values up to 11.4 μm in the disclosed embodiments), an alpha value greater than or equal to about 2.3 and less than about 2.7 at a wavelength of 1550 nm, and a maximum relative refractive index $\Delta_{1MAX}$ from about 0.3% to about 0.6% relative to the cladding. The optical fiber also has an effective area greater than about 90 μm² and less than about 160 μm². The cladding has a maximum relative refractive index $\Delta_{4MAX}$ such that $\Delta_{1MAX} > \Delta\Delta_{MAX}$, and the differential group delay between the LP01 and LP11 modes is less than about 0.5 ns/km at a wavelength of 1550 nm.

However, according to this first known solution, the core and cladding support only the LP01 and LP11 modes at wavelengths greater than 1500 nm, which is a too small number of modes compared to the increasing demand on per-fiber transmission capacity.

A second known solution is disclosed in US 2013/007115, which disclose another specific design for Few-Mode Fibers. However, like the first known solution disclosed in US 2013/0071114, this second known-solution also consists in a FMF supporting only two guided modes.

Other known designs have led to FMFs supporting up to 4 or even 6 modes.

The PCT patent document WO 2012/161809 thus discloses a few-mode optical fiber comprising a core surrounded by a cladding, having a graded index profile that is structured to support propagation of a plurality of desired signal-carrying modes, while suppressing undesired modes. The core and cladding are configured such that the undesired modes have respective effective indices that are close to, or less than, the cladding index such that the undesired modes are leaky modes. The index spacing between the desired mode having the lowest effective index and the leaky mode with the highest effective index is sufficiently large so as to substantially prevent coupling therebetween. FMF supporting up to 4 modes are shown in examples.

The US 2012/0328255 patent document discloses few-mode optical fibers including a glass core and a glass cladding surrounding and in direct contact with the glass core. The glass core may include a radius $R_{1i}$ from about 8 µm to about 13 µm; a graded refractive index profile with an alpha value between about 1.9 and 2.1 at a wavelength of 1550 nm; and a maximum relative refractive index $\Delta_{1MAX}$ from about 0.6% to about 0.95% relative to the glass cladding. The effective area of the LP01 mode at 1550 nm may be between 80 µm$^2$ and 105 µm$^2$ such that the core supports the propagation and transmission of an optical signal with X LP modes at a wavelength of 1550 nm, wherein X is an integer greater than 1 and less than 10. The glass cladding may include a maximum relative refractive index $\Delta_{4MAX}$ such that $\Delta_{1MAX} > \Delta\Delta_{MAX}$. FMF supporting up to 6 modes are shown in examples.

Although such designs are promising, they do not allow reducing the Differential Mode Group Delays as much as desired, and therefore induce limits in the transmission system reach. In addition, the profiles disclosed in both documents are not optimized to ensure low bend losses and high leakage losses, which, however, are important issues for FMFs. Actually, none of the known documents relating to FMFs addresses the issue of designing a few-mode fiber showing low bend losses and high leakage losses.

Moreover, all these known techniques aim at providing new improved designs for few-mode fibers, and are based on theoretical criteria, which must be met by the fibers. However, these designs might be sensitive to small variations that can occur during the manufacturing process, such as profile variations, radius variations or refractive index difference variations for example. It is indeed very difficult to repeatedly manufacture optical fibers, which perfectly show the theoretical features, which were aimed at.

In the beginning of the 80s, a technique was proposed for multi-mode fibers, consisting in associating several optical fibers to form an optical link, where the optical link showed improved performance as compared to the individual optical fibers, thanks to a phenomenon of compensation of the fibers' imperfections. Such a technique has not yet been transposed to few-mode fiber links.

Accordingly, a need exists for design for few-mode optical fiber links guiding 4 LP modes or more, with small differential mode group delays, low bend losses and high leakage losses.

3. SUMMARY OF THE INVENTION

In one particular embodiment of the invention, an optical link is proposed, which comprises N optical fibers, with N≥2, N being an integer. Each optical fiber comprises an optical core and an optical cladding surrounding the optical core, the optical core having a single $\alpha_i$ graded-index profile with $\alpha_i \geq 1$, $\alpha_i$ being a non-dimensional parameter that defines the index profile shape of the optical core, and the optical core having a radius $R_{1i}$ and a maximal refractive index $n_{0i}$, where $i \in [[1; N]]$ is an index designating said optical fiber. Said optical cladding has at its outer edge a refractive index $n_{Cli}$, and comprises a region of depressed refractive index $n_{trenchi}$, called a trench, surrounding the optical core, said trench having an inner radius $R_{2i}$, with $R_{2i} \geq R_{1i}$, and an outer radius $R_{3i}$, with $R_{3i} > R_{2i}$.

Said optical link is such that an average optical core radius $R_{1link}$ for said optical link satisfies a criterion C of quality of optical communications defined by the following equation:

$$C = 10 \cdot \frac{\text{Max} | DMGD_{link} |}{(R_{1link}^2 \cdot Dn_{1link})^3}$$

where $DMGD_{link}$ is the Differential Mode Group Delay between two guided modes in said optical link,
where $\text{Max}|DMGD_{link}|$ is the absolute maximum value of DMGD between any combination of guided modes in the link,
where $$R_{1link} = \frac{\sum_{i=1}^{N} R_{1i} L_i}{\sum_{i=1}^{N} L_i}$$

with $L_i$ a length of optical fiber i in said link,
and where $$Dn_{1link} = \frac{\sum_{i=1}^{N} Dn_{1i} L_i}{\sum_{i=1}^{N} L_i}$$

with $Dn_{1i} = n_{0i} - n_{Cli}$ is the core-cladding index difference for optical fiber i, at $\lambda = \lambda_C$, where $\lambda_c$ is a central transmission wavelength of an operating band for which said optical fiber is intended,
and is such that, for at least one optical fiber t in said link, said optical core radius $R_{1t}$ is chosen such that $R_{1t} > 13.5$ µm and for all optical fibers $i \in [[1; N]]$ in said link, said length $L_i$ are chosen such that $C \leq 18$.

As used herein, and unless otherwise specified, the term "single $\alpha_i$ graded-index profile" refers to an optical core having a refractive index profile n(r) defined as follows:

$$n(r) = n_{0i} \cdot \sqrt{1 - 2 \cdot \Delta \cdot \left(\frac{r}{R_{1i}}\right)^{\alpha_i}} \quad r \leq R_{1i}$$

where:
r is a variable representative of the radius of the optical fiber,
$R_{1i}$ is the optical core radius,
$\Delta$ is the normalized refractive index difference, with $$\Delta = \frac{n_{0i}^2 - n_{1i}^2}{2n_{0i}^2}$$

$n_{1i}$ is the minimal refractive index of the optical core,
$n_{0i}$ is the maximal refractive index of the optical core,
$\alpha_i$ is a non-dimensional parameter that defines the index profile shape of the optical core.

An alpha parameter α=2 corresponds to an inverted parabola. An alpha parameter α=1 corresponds to a triangular shape, while an alpha parameter α=∞ corresponds to a step function.

The grading of the index can be tailored to reduce group velocity mismatch between the low-loss core-guided modes.

By properly choosing the respective lengths $L_i$ of all optical fibers constituting the optical link, it is possible to build a few-mode optical fiber link, which allow guiding an increased number of LP modes as compared to prior art FMFs, while reaching the lowest Differential Mode Group Delay. Such an optical link is hence a DMGD-compensated FMF link and may show improved properties over the individual FMFs comprised in said optical link. Such low DMGD allow all modes being simultaneously detected using 2N×2N (N being the total number of spatial modes, i.e. including LP mode degeneracies) MIMO ("Multiple Input Multiple Output") techniques, regardless mode coupling phenomena. The system reach is thus increased over prior art.

It has to be noted, however, that less complex MIMO techniques could also be used, to detect groups of modes showing close effective index differences, instead of detecting all modes individually.

Having a core radius $R_{1i} \geq 13.5$ μm allows guiding a higher number of modes, as compared to prior art techniques, such as those disclosed in the US 2012/0328255, US 2013/0071114 and US 2013/0071115 patent documents.

Moreover, a depressed trench-assisted optical fiber leads to decrease the macrobending losses by improving the confinement of the optical modes within the core. Thus, adding a trench in the cladding of the few-mode fibers of such an optical link, which satisfies the criteria $R_{1i} > 13.5$ μm and C≤18, allows to significantly improve the trade-off between DMGD and bend losses, such a trench being a well-known way to reduce the bending sensitivity.

According to one advantageous characteristic, at least one of the optical fibers comprised in such an optical link has trench parameters satisfying the following relationship:

$$55 \leq 1000 \cdot |(R_{3i} - R_{2i}) \cdot Dn_{3i} \cdot (R_{1i}^2 \cdot Dn_{1i})| \leq 150$$

where $Dn_{3i} = n_{trenchi} - n_{Cli}$ is the trench-cladding index difference at $\lambda = \lambda_C$. Preferably, $Dn_3 \leq -3 \cdot 10^{-3}$.

A trench having such features provides a few-mode fiber showing a good trade-off between bend losses and leakage losses, which helps improve the properties of the optical link it belongs to. A few-mode fibers link according to the invention supports an increased number of LP modes as compared to prior art FMFs, while ensuring low DMGDs, and shows low bend losses (<100 dB/turn at 10 mm bend radius at 1550 nm) for all guided modes, so that they can robustly propagate, and high leakage losses (>0.1 dB/m at 1550 nm) for all the leaky modes, so that they can be cut-off and/or highly attenuated after few tens of meters.

In an embodiment of the invention, several or all the optical fibers of the optical link have a trench satisfying such a trench criterion.

In another embodiment, at least one of said optical fibers has an optical core radius $R_i$ and an α-value of said graded index profile such that:

$$C = 10 \cdot \frac{\text{Max}|DMGD_i|}{(R_{1i}^2 \cdot Dn_{1i})^3} \leq 18$$

where $DMGD_i$ is the Differential Mode Group Delay between two guided modes in said optical fiber, where Max|$DMGD_i$| is the absolute maximum value of DMGD between any combination of guided modes in said optical fiber, and where $Dn_{1i} = n_{0i} - n_{Cli}$ is the core-cladding index difference at λ=1550 nm for said optical fiber. Preferably, said optical fiber is such that $R_{1i} < 20$ μm.

Hence, there may be one, two, or even all the optical fibers in said optical link, which core individually meets the C≤18 criterion set forth by the inventors. This allows designing DMGD-compensated links with very low DMGDs, close to the minimum theoretical value.

It is also possible that several or all optical fibers in said link satisfy both the core criterion C≤18 and the trench criterion $55 < 1000 \cdot (R_{3i} - R_{2i}) \cdot Dn_{3i} \cdot (R_{1i}^2 \cdot Dn_{1i}) < 150$.

According to an embodiment of the invention, such an optical link guides at least 4 LP modes, and preferably 4 to 16 LP modes.

According to another embodiment of the invention, such an optical link guides at least 6 LP modes, and preferably 6 to 16 LP modes.

Such a high number of guided modes allow increasing the capacity of an optical system comprising such a few-mode optical fiber link, and answers the demand for higher bandwidth in long-haul optical transmission systems.

A few-mode link according to an embodiment of the invention thus guides an increased number of LP modes that can efficiently be used in space-division multiplexed transmissions, as compared to prior art FMFs.

According to an advantageous feature of the invention, for all optical fibers i∈[[1; N]] in said link, said lengths $L_i$ are chosen so as to minimize Max|$DMGD_{link}$| on said link.

It is thus possible to reach a very low DMGD value, as close as possible to the minimal theoretical value.

According to another aspect, at least two optical fibers in said link have $DMGD_i$ showing opposite signs for at least one mode guided by said optical fibers, where $DMGD_i$ is the Differential Mode Group Delay between said one mode and any other guided mode in optical fiber t.

It is thus possible to really achieve a good DMGD compensation by concatenating the fibers of appropriate lengths, and thus build an optical link showing a lower DMGD than each and every optical fiber in said link.

According to a first embodiment, for at least one of said fibers i∈[[1; N]] in said optical link, said optical core has a minimal refractive index $n_{1i} = n_{Cli}$, and said optical cladding also comprises an inner cladding layer directly surrounding said optical core, with an inner radius $R_{1i}$ and an outer radius $R_{2i} \geq R_{1i}$, said inner cladding layer having a constant refractive index $n_{2i}$, such that $n_{2i} \neq n_{Cli}$ and $n_{2i} \geq n_{trenchi}$.

Such a graded-index trench-assisted profile allows meeting the core criterion and the trench criterion set forth in an embodiment of the invention. Moreover, such a few-mode fiber is easy to manufacture and costs little. The inner cladding layer may either have a negative or a positive refractive index difference with the core.

According to a second embodiment, for at least one of said fibers i∈[[1; N]] in said optical link, said optical core has a minimal refractive index $n_{1i} \neq n_{Cli}$, and said optical cladding also comprises an inner cladding layer directly surrounding said optical core, with an inner radius $R_{1i}$ and an outer radius $R_{2i} \geq R_{1i}$, said inner cladding layer having a constant refractive index $n_{2i}$, such that $n_{2i} = n_{1i}$ and $n_{2i} > n_{trenchi}$.

Such an alternate graded-index trench-assisted profile allows meeting the core criterion and the trench criterion set forth in an embodiment of the invention. Moreover, such a few-mode fiber is easy to manufacture and costs little. The inner cladding layer may either have a negative or a positive refractive index difference with the core.

According to a third embodiment, for at least one of said fibers i∈[[1; N]] in said optical link, said optical core has a minimal refractive index that equals $n_{C1i}$, said optical cladding also comprises an inner cladding layer directly surrounding said optical core, with an inner radius $R_{1i}$ and an outer radius $R_{2i} \geq R_{1i}$, said inner cladding layer being an extension of said single $\alpha_i$ refractive graded-index profile of said optical core, and said inner layer has a minimal refractive index $n_{1i} = n_{trenchi}$.

Although manufacturing such a few-mode fiber is somehow more difficult, as compared to the first and second embodiments, such a graded-index trench-assisted profile allows better optimizing the α parameter of the graded index profile.

Another aspect of the disclosure concerns an optical system comprising at least one optical fiber as described here above in any of its embodiments.

It is noted that the FMF optical links described herein and throughout the document are suitable for use within, at a minimum, the entire "C-band", but also in some cases the S-, C- U- and L-bands.

5. BRIEF DESCRIPTION OF THE FIGURES

Other features and advantages of embodiments of the invention shall appear from the following description, given by way of an indicative and non-exhaustive examples and from the appended drawings, of which:

FIG. 1 schematically depicts an optical link according to an embodiment of the invention, such an optical link comprising several concatenated few-mode optical fibers;

FIG. 2 schematically depicts a cross section of an optical fiber according to one or more embodiments described herein;

FIG. 3A graphically provides the refractive index profile of an optical fiber according to a first embodiment of the invention;

FIG. 3B graphically provides the refractive index profile of an optical fiber according to a second embodiment of the invention;

FIG. 3C graphically provides the refractive index profile of an optical fiber according to a third embodiment of the invention;

Figure 6:
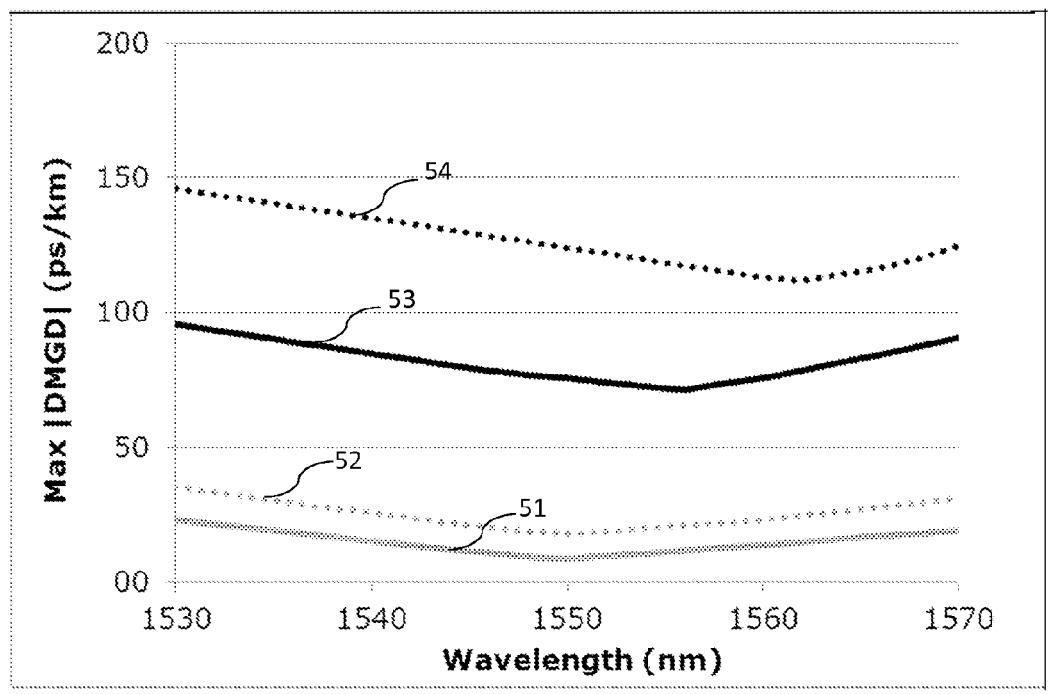
Figure 7:
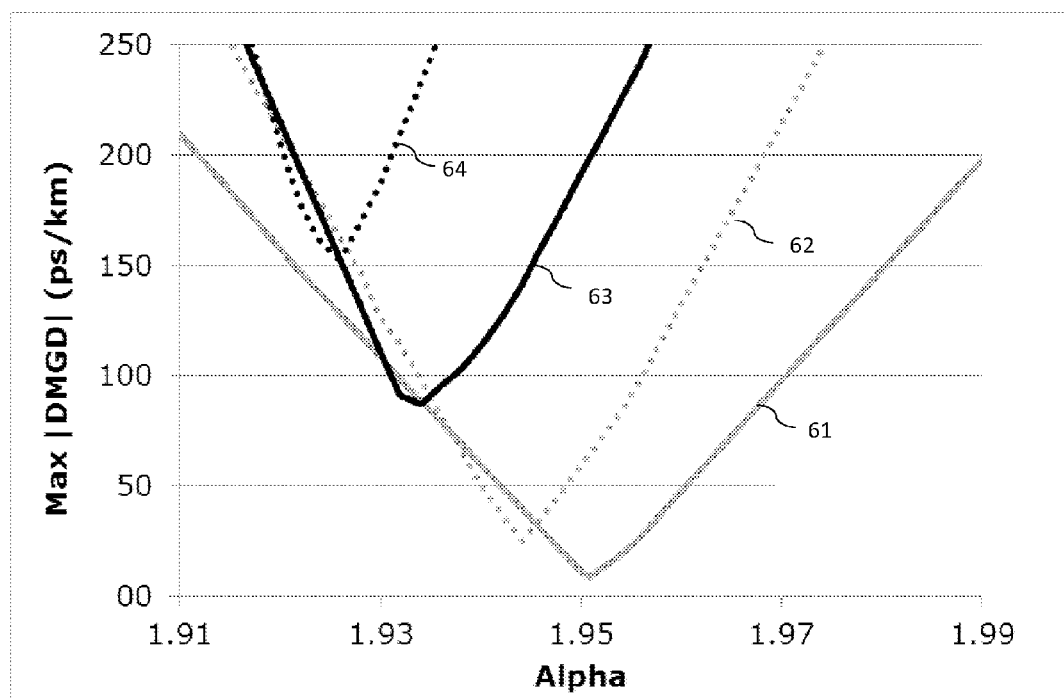
Figure 8A:
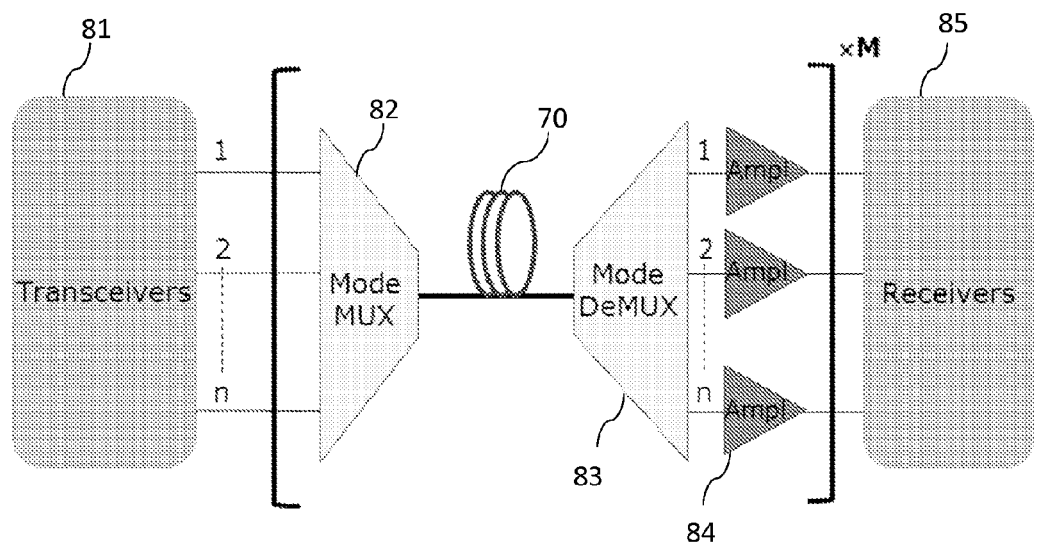
Figure 8B:
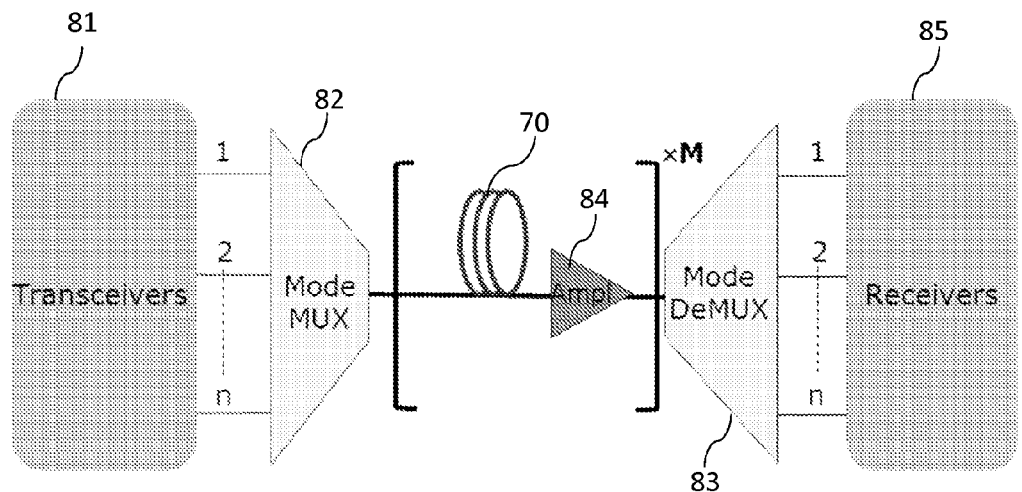

FIG. 6 graphically depicts the Max|DMGD| as a function of wavelength for some embodiments of the invention;

FIG. 7 illustrates the Max|DMGD| as a function of a for some embodiments of the invention;

FIGS. 8A and 8B illustrate optical systems according to embodiments of the invention.

6. DETAILED DESCRIPTION

The general principle of the invention is to propose a carefully designed trench-assisted graded index few-mode optical fibers link, showing reduced Differential Mode Group Delay and supporting more LP modes over prior art FMFs. More precisely, the purpose of such an optical link is, among others, to compensate for small profile variations that can occur during the manufacturing process of a few-mode fiber by concatenating several FMFs showing different features. Such an optical link allows reaching an improved trade-off over prior art FMFs between reduced Differential Mode Group Delay, reduced bend loss and increased leakage loss. Moreover, designing such DMGD-compensated FMF links is an efficient and robust way to reach low DMGDs.

Light travelling in an optical fiber actually forms hybrid-type modes, which are usually referred to as LP (linear polarization) modes. The $LP_{0p}$ modes have tow polarization degrees of freedom and are two-fold degenerate, and the $LP_{mp}$ modes with $m \geq 1$ are four-fold degenerate. These degeneracies are not counted when designating the number of LP modes propagating in the fiber. Hence, a few-mode optical fiber having two LP modes supports the propagation of all of the $LP_{01}$ and $LP_{11}$ modes, or a few-mode fiber guiding 6 LP modes supports the propagation of all of the $LP_{01}$, $LP_{11}$, $LP_{02}$, $LP_{21}$, $LP_{12}$ and $LP_{31}$ modes.

Reference will now be made in detail to embodiments of few-mode optical fibers comprised in an optical link according to an embodiment of the invention, examples of which are illustrated in the accompanying drawings. Whenever possible, the same reference numerals will be used throughout the drawings to refer to the same or like parts.

Figure 1:
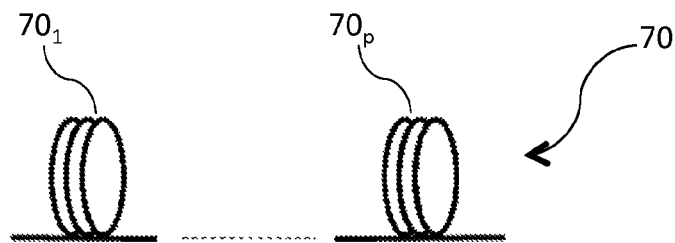

One embodiment of a few-mode optical fiber link according to the invention is schematically depicted in FIG. 1. The optical link 70 is built by concatenating several few-mode fibers (for example such an optical link 70 comprises p spans of optical fibers, with $p \geq 2$, which are spliced together. FIG. 1 only shows optical fiber 701 and optical fiber 70p, all the other potential optical fibers i∈[[1; N]] in the optical link being symbolized by dashed lines).

Few-mode fiber 1 has a length $L_1$, few-mode fiber i has a length $L_i$ and few-mode fiber p has a length $L_p$. As will be described in more details below, such lengths $L_1, \ldots L_i, \ldots L_p$ are chosen such that the optical link 70 satisfies a criterion of quality of optical communications defined by the following equation:

$$C = 10 \cdot \frac{\text{Max}|DMGD_{link}|}{(R_{1link}^2 \cdot Dn_{1link})^3} \leq 18$$

where $DMGD_{link}$ is the Differential Mode Group Delay between two guided modes in optical link 70, where $$R_{1link} = \frac{\sum_{i=1}^{p} R_{1i}L_i}{\sum_{i=1}^{p} L_i},$$

and where $$Dn_{1link} = \frac{\sum_{i=1}^{p} Dn_{1i}L_i}{\sum_{i=1}^{p} L_i}$$

with $Dn_{1i}=n_{0i}-n_{Cli}$ is the core-cladding index difference at $\lambda=1550$ nm for optical fiber $i\in[[1; N]]$. In addition, at least one of the optical fibers 1 to p in link 70 has an optical core radius $R_{1i}$ such that $R_{1i} \geq 13.5$ µm, $i\in[1; p]$.

Few-mode fibers 1 to p are hence spliced together to form an optical link 70 of length $L=L_1+ \ldots +L_i+ \ldots +L_p$, which can be of several tens or several hundreds of kilometers.

Of course, the present disclosure encompasses any number of few-mode fibers concatenated to form an optical link; as a mere example, such a link may comprise only two FMFs, four FMFs, or even several tens of FMFs.

The following disclosure will now focus on the structure and characteristics of optical fibers making up an optical link according to the invention.

6.1 Few-Mode Optical Fibers

Figure 2:
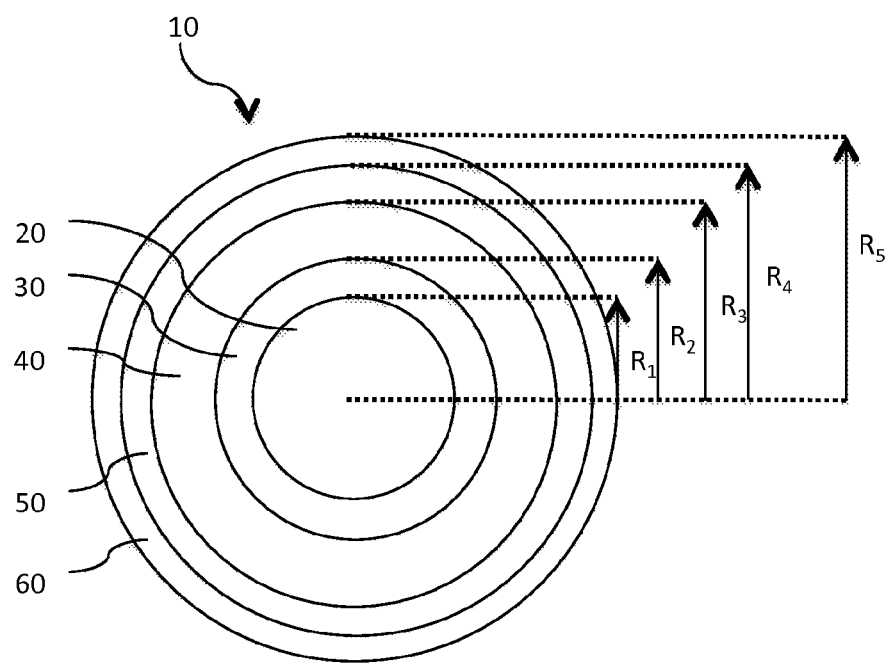

One embodiment of a few-mode optical fiber used in an optical link according to the invention is schematically depicted in cross section in FIG. 2. The optical fiber 10 generally has a glass core 20 surrounded by a glass cladding. The glass core 20 generally has a radius $R_{1i}$ from about 13.5 µm to about 20 µm. The cladding generally has an inner radius $R_1$ and an outer radius $R_4$. In the embodiments shown and described herein, the core 20 and the cladding generally comprise silica, specifically silica glass. The cross-section of the optical fiber 10 may be generally circular-symmetric with respect to the center of the core 20. In some embodiments described herein, the radius $R_4$ (i.e. the radius of the glass portion of the optical fiber 10) is about 62.5 µm. However, it should be understood that the dimensions of the cladding may be adjusted such that the radius $R_4$ may be greater than or less than 62.5 µm. The optical fiber 10 also comprises a coating 60 of inner radius $R_4$ and of outer radius $R_5$. Such a coating may comprise several layers, and it may notably be a dual-layer coating, although these different layers are not shown on FIG. 2. It must be noted that $R_4$ and $R_5$ are the lower and upper limits of the coating, whatever the number of layers in-between. In some embodiments described herein, the radius $R_5$ is about 122.5 µm (but it could be greater or less than 122.5 µm). In alternative embodiments, other dimensions could be such that $R_4=40$ µm or $R_4=50$ µm, and $R_5=62.5$ µm.

All few-mode fibers in an optical link according to the invention share the common features described above in relation to FIG. 2.

Figure 3A:
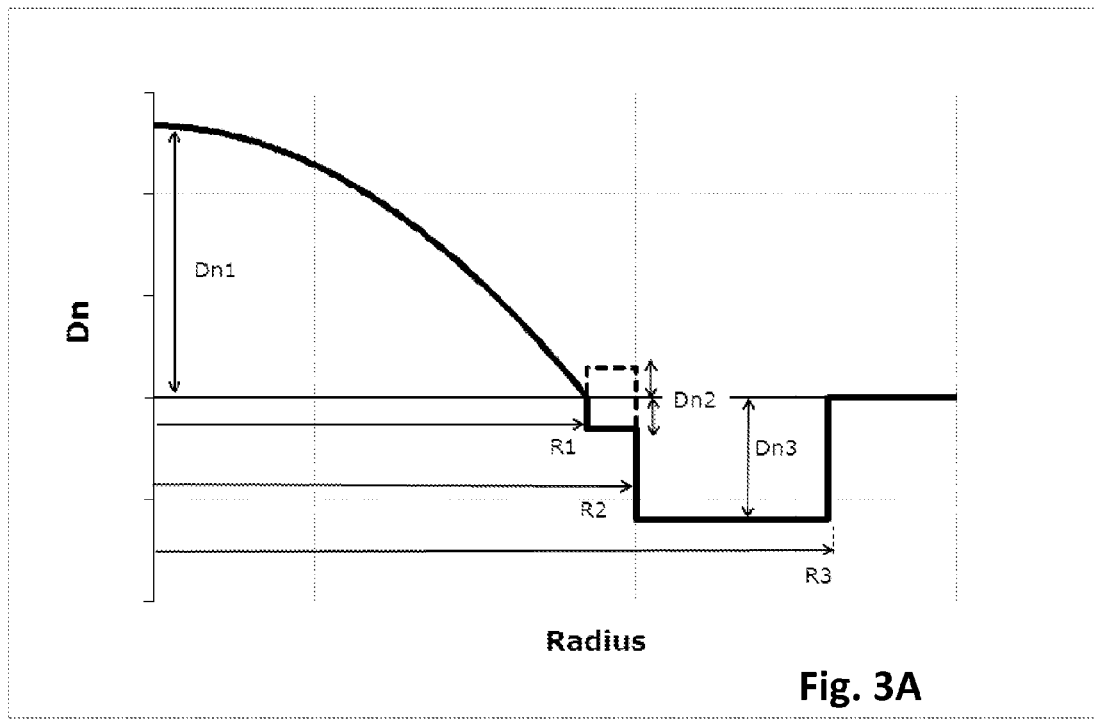

FIG. 3A depicts the refractive index profile n(r) of optical fiber 10 according to a first embodiment of the invention. It describes the relationship between the refractive index value n and the distance r from the center of the optical fiber. The x-axis represents radial position with x=0 representing the center of the core region, and the y-axis represents refractive index, expressed as an index difference Dn unless otherwise stated.

According to embodiments of the invention, it is possible that only one, or several, or all, or even none of the optical fibers making up an optical link according to the invention show the refractive index of FIG. 3A.

In that first embodiment, the optical fiber 10 has an optical core 20 having a refractive index profile n(r) defined as follows:

$$n(r) = n_0 \cdot \sqrt{1 - 2 \cdot \Delta \cdot \left(\frac{r}{R_1}\right)^\alpha} \quad r \leq R_1$$

where:
r is a variable representative of the radius of the optical fiber,
$R_1$ is the optical core radius,
$\Delta$ is the normalized refractive index difference, with $$\Delta = \frac{n_0^2 - n_1^2}{2n_0^2}$$

$n_1$ is the minimal refractive index of the optical core,
$n_0$ is the maximal refractive index of the optical core,
$\alpha$ is a non-dimensional parameter that defines the index profile shape of the optical core.

The alpha refractive index profile of the optical core 20 allows reducing intermodal dispersion of the optical fiber 10.

The optical core 20 is directly surrounded by an optical cladding, which comprises at least a depressed-index ring 40, also called a trench, with inner radius $R_2$ and outer radius $R_3$, and an outer cladding layer 50 with inner radius $R_3$. In some embodiments such an outer cladding layer 50 comprises pure silica glass ($SiO_2$) and its refractive index $n_{Cl}$ is hence that of silica glass. This trench 40 has a negative refractive index difference $Dn_3=n_{trench}-n_{Cl}$ with respect to the refractive index of the outer cladding, and its position and size are designed so as to improve bend-loss resistance of the fiber.

Preferably, the trench 40 is designed so as to fulfill the following criterion:

$$55 \geq 1000 \cdot |(R_3-R_2) \cdot Dn_3 \cdot (R_1^2 \cdot Dn_1)| \leq 150$$

where $Dn_3=n_{trench}-n_{Cl}$ is the trench-cladding index difference at $\lambda=\lambda_C$, a central wavelength of an operating band for which the optical fiber is intended (for example $\lambda=1550$ nm). Such a criterion allows reaching a good trade-off between bend losses and leakage losses in the fiber.

The cladding may also optionally include an inner cladding layer 30, with inner radius $R_1$ and outer radius $R_2$. The trench 40 may hence be spaced apart from the core 20 by the inner cladding layer 30. Alternatively, the trench 40 may surround and directly contact the core portion 20.

In this first embodiment, the inner cladding 30 has a constant refractive index $n_2$, such that $n_2 > n_{trench}$, and which may either show a negative or a positive (shown in dashed lines on FIG. 2A) refractive index difference $Dn_2=n_2-n_{Cl}$ with respect to the optical fiber outer cladding.

The different portions 30, 40, 50 in the cladding may comprise pure silica glass ($SiO_2$), silica glass with one or more dopants, which increase the index of refraction (e.g. $GeO_2$ or any other known dopant), such as when the portion of the cladding is "up-doped", or silica glass with a dopant, which decreases the index of refraction, such as fluorine, such as when the portion of the cladding is "down-doped" (e.g. for the trench 40).

Although not illustrated on FIG. 1, the outer cladding 50 may also comprise other portions or layers of lower or higher refractive indexes, for $r > R_3$.

In the first embodiment illustrated by FIG. 3A, the minimal refractive index of the core $n_1$ is equal to the refractive index of the outer cladding $n_{Cl}$.

The down-doped trench 40 can provide lower bending loss.

Figure 3B:
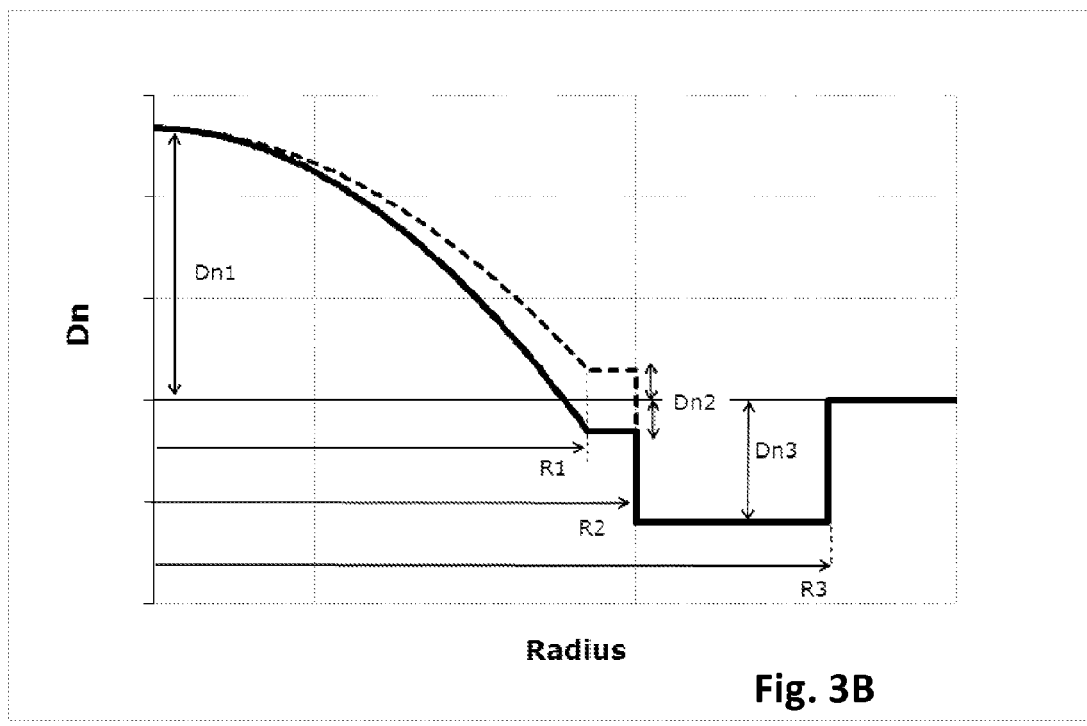

FIG. 3B depicts the refractive index profile n(r) of an optical fiber according to a second embodiment of the invention. Once again, there may be embodiments of the invention where only one, or several, or all, or even none of the optical fibers in said optical link show the profile of FIG. 3B.

Such a profile differs from that of the first embodiment in that the minimal refractive index of the core $n_1$ is not equal to the refractive index of the outer cladding $n_{Cl}$ but may either show a negative or a positive (shown in dashed lines on FIG. 2B) refractive index difference with respect to the optical fiber outer cladding. In case the cladding comprises an inner cladding layer 30, the minimal refractive index of the core $n_1$ is equal to the constant refractive index of the inner cladding $n_2$, which may either show a negative or a positive (shown in dashed lines on FIG. 2B) refractive index difference $Dn_2=n_2-n_{Cl}$ with respect to the optical fiber outer cladding.

Like in the first embodiment, the outer cladding 50 may also comprise other portions or layers of lower or higher refractive indexes, for $r>R_3$.

Like in the first embodiment, the trench 40 is preferably designed so as to fulfill the following criterion:

$$55 \leq 1000 \cdot |(R_3-R_2) \cdot Dn_3 \cdot (R_1^2 \cdot Dn_1)| \leq 150$$

where $Dn_3=n_{trench}-n_{C1}$ is the trench-cladding index difference at $\lambda=\lambda_C$, a central wavelength of an operating band for which the optical fiber is intended (for example $\lambda=1550$ nm).

Figure 3C:
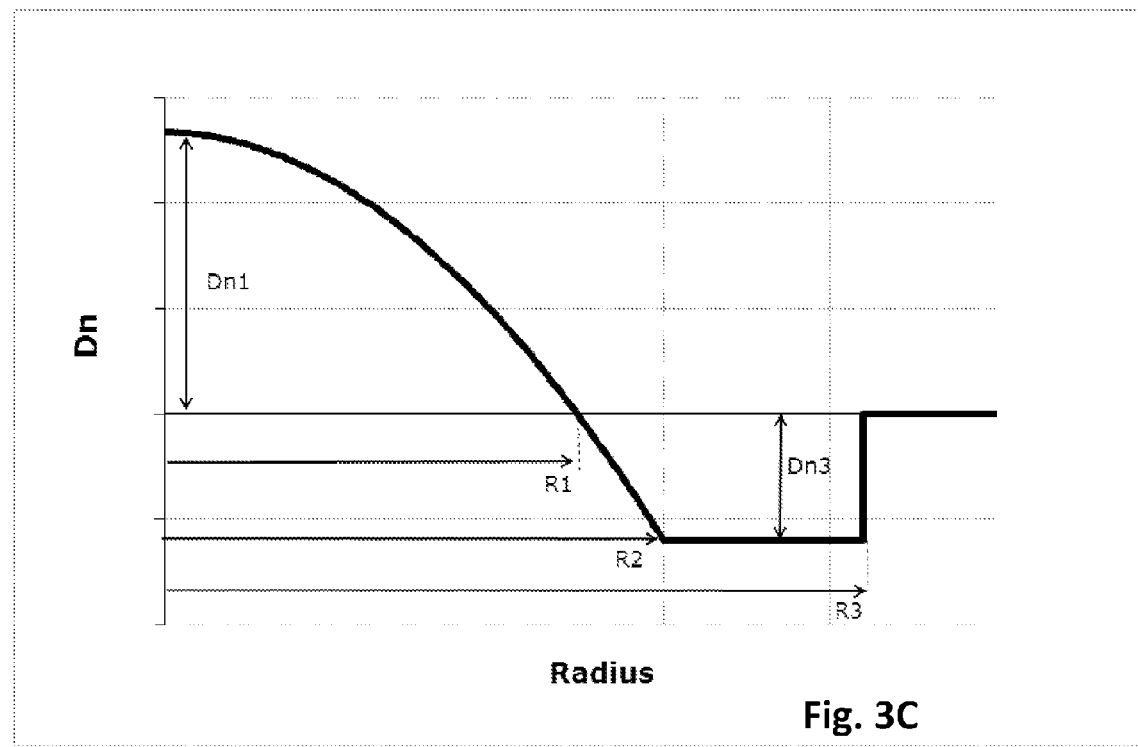

FIG. 3C depicts the refractive index profile n(r) of an optical fiber according to a third embodiment of the invention. Once again, there may be embodiments of the invention where only one, or several, or all, or even none of the optical fibers in said optical link show the profile of FIG. 3C.

In this third embodiment, the inner cladding layer 30 is an extension of the graded index core 20, such that both the optical core 20 and the inner cladding layer 30 have a refractive index profile n(r) defined as follows:

$$n(r) = n_0 \cdot \sqrt{1 - 2 \cdot \Delta \cdot \left(\frac{r}{R_2}\right)^\alpha} \quad r \leq R_2$$

where:
r is a variable representative of the radius of the optical fiber,
$R_2$ is the outer radius of the inner cladding layer 30,
$\Delta$ is the normalized refractive index difference, with $$\Delta = \frac{n_0^2 - n_1^2}{2n_0^2}$$

$n_1$ is the minimal refractive index of the inner cladding layer (i.e. the refractive index at radius $R_2$),
$n_0$ is the maximal refractive index of the optical core,
$\alpha$ is a non-dimensional parameter that defines the index profile shape of both the optical core and the inner cladding layer.

Hence, in this third embodiment, the term "single-α graded-index profile" has a slightly different meaning as compared to the first two embodiments, since this graded-index profile goes beyond the optical core until the outer edge of the inner cladding layer.

The optical cladding also comprises at least a depressed-index ring 40, with inner radius $R_2$ and outer radius $R_3$, and an outer cladding layer 50 with inner radius $R_3$. In some embodiments such an outer cladding layer 50 comprises pure silica glass ($SiO_2$) and its refractive index $n_{Cl}$ is hence that of silica glass. The trench 40 has a negative refractive index difference $Dn_3=n_{trench}-n_{Cl}$ with respect to the refractive index of the outer cladding, and its position and size are designed so as to improve bend-loss resistance of the fiber.

Like in the first and second embodiments, the outer cladding 50 may also comprise other portions or layers of lower or higher refractive indexes, for $r>R_3$.

Like in the first and second embodiments, the trench 40 is preferably designed so as to fulfill the following criterion:

$$55 \leq 1000 \cdot |(R_3-R_2) \cdot Dn_3 \cdot (R_1^2 \cdot Dn_1)| \leq 150$$

where $Dn_3=n_{trench}-n_{Cl}$ is the trench-cladding index difference at $\lambda=\lambda_C$, a central wavelength of an operating band for which the optical fiber is intended (for example $\lambda=1550$ nm).

Figure 4:
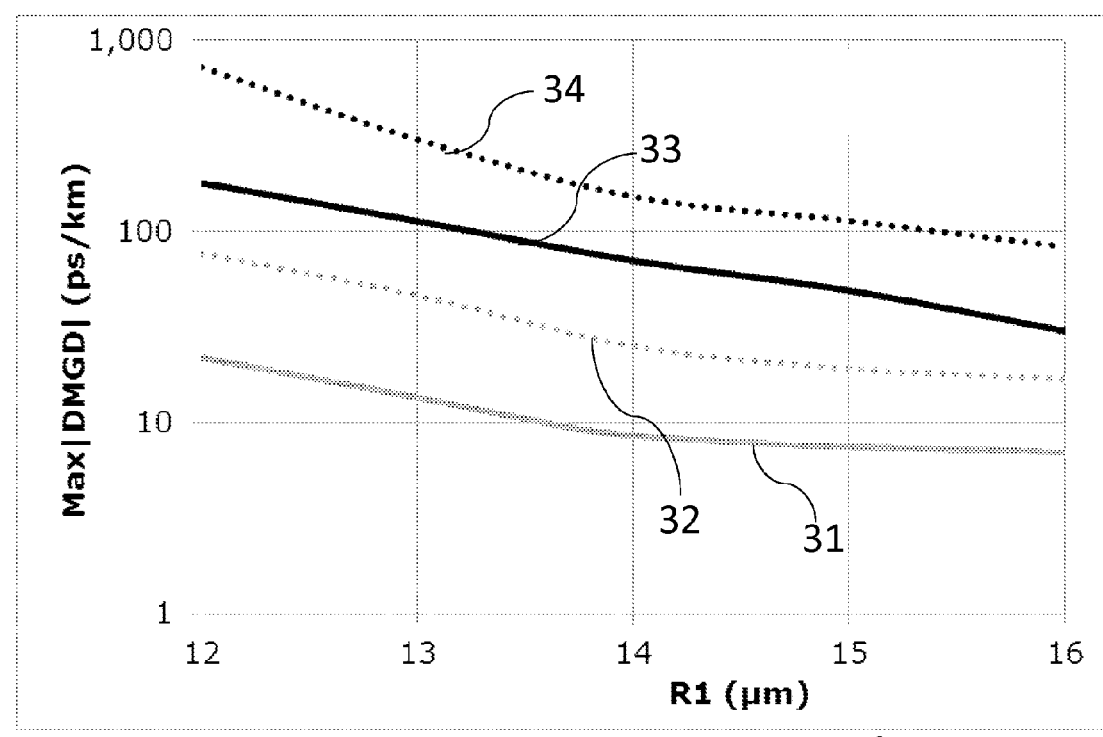
FIG. 4 illustrates how Differential Mode Group Delays decrease as a function of $R_1$ for few-mode fibers supporting 6 to 16 LP guided modes for graded-index trench-assisted structures in accordance with the invention.

FIG. 4 illustrates how the maximum of the Differential Mode Group Delays Max|DMGD| between any two LP modes guided in the optical fiber decreases as a function of the core radius $R_1$ for FMFs guiding 6, 9, 12 and 16 modes according to one of the embodiments of FIGS. 3A-3C. The x-axis depicts the core radius of the fiber $R_1$, ranging from 12 to 16 μm. The y-axis depicts the Max|DMGD| expressed as ps/km on a logarithmic scale. Curve 31 corresponds to a FMF guiding 6 LP modes; curve 32 corresponds to a FMF guiding 9 LP modes; curve 33 corresponds to a FMF guiding 12 LP modes, while curve 34 corresponds to a FMF guiding 16 LP modes.

Figure 5:
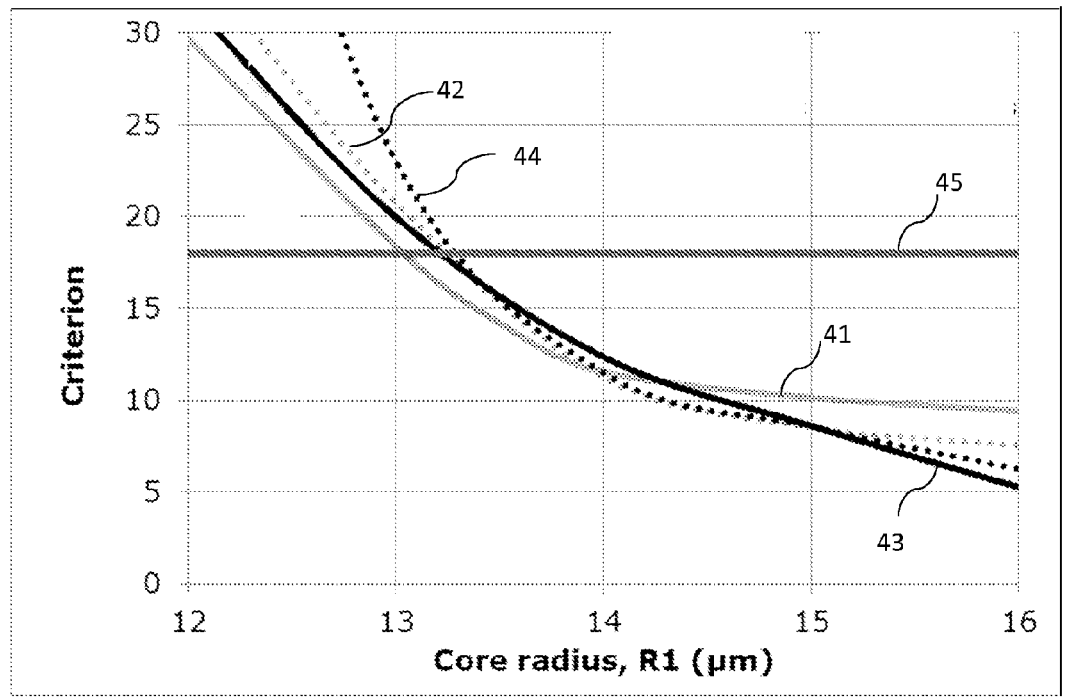
FIG. 5 shows the C criterion set forth in the invention for few-mode fibers supporting 6 to 16 LP guided modes as a function of $R_1$ for graded-index trench-assisted structures in accordance with the invention.

FIG. 5 jointly illustrates how the criterion $$C = 10 \cdot \frac{\text{Max}|DMGDs|}{(R_1^2 \cdot Dn_1)^3},$$

where DMGD is the Differential Mode Group Delay between two guided modes in said optical fiber and where $Dn_1=n_0-n_{Cl}$ is the core-cladding index difference at $\lambda=\lambda_C$, a central wavelength of an operating band for which the optical fiber is intended, also decreases as a function of the core radius $R_1$ for FMFs guiding 6, 9, 12 and 16 modes according to one of the embodiments of FIGS. 3A-3C. The x-axis depicts the core radius of the fiber $R_1$, ranging from 12 to 16 μm. The y-axis depicts the C criterion ranging from 0 to 30. Curve 41 corresponds to a FMF guiding 6 LP modes; curve 42 corresponds to a FMF guiding 9 LP modes; curve 43 corresponds to a FMF guiding 12 LP modes, while curve 44 corresponds to a FMF guiding 16 LP modes.

As can be observed from both figures, a good trade-off may be obtained by setting the core radius $R_1 \geq 13.5$ μm. This allows reaching low values for Max|DMGD|, whatever the number of LP guided modes in the fiber. By setting the lower limit of the core radius at 13.5 μm, it is possible to guide a high number of LP modes in the FMF, and thus reach a good per-fiber capacity, while, thanks to low Max|DMGD| values, bridge long distances.

Once the core radius has been set at a minimum value of 13.5 μm, it can be deduced from FIG. 5 that an adequate upper limit for the C criterion can be set at a value of 18: C<18. Such an upper limit allowable for FMFs of the invention is illustrated by horizontal straight line 45 on FIG. 4.

As can be observed from FIGS. 4 and 5, for FMFs supporting 6 LP guided modes, the normalized frequency $$V = \frac{2\pi R_1}{\lambda} \sqrt{n_0^2 - n_{Cl}^2},$$

where $\lambda$ is the operating wavelength) is preferably between 7.8 and 9.8. Max|DMGD| is preferably <25 ps/km, and more preferably <15 ps/km, at $\lambda$, here 1550 nm. More generally, such values can be achieved for any central transmission wavelength $\lambda_C$ of any operating wavelength band for which the optical fiber is intended, such as the C-band, or the L-, S-, or U-band for example. Max|DMGD| is also preferably <50 ps/km and more preferably <30 ps/km from 1530 to 1570 nm. More generally, such values can be achieved for any operating wavelength band $[\lambda_C-\delta\lambda; \lambda_C+\delta\lambda]$ where $2\delta\lambda$ is a width of said operating band, preferably $\delta\lambda=20$ nm, such as the C-band, or the L-, S-, or U-band for example.

For FMFs supporting 9 LP guided modes, V is preferably between 9.8 and 11.8. Max|DMGD| is preferably <100 ps/km, and more preferably <60 ps/km, at λ, here 1550 nm (and more generally for any central transmission wavelength $\lambda_C$ of any operating wavelength band for which the optical fiber is intended). Max|DMGD| is also preferably <200 ps/km and more preferably <120 ps/km from 1530 to 1570 nm. More generally, such values can be achieved for any operating wavelength band $[\lambda_C-\delta\lambda; \lambda_C+\delta\lambda]$ where $2\delta\lambda$ is a width of said operating band, preferably $\delta\lambda=20$ nm, such as the C-band, or the L-, S-, or U-band for example.

For FMFs supporting 12 LP guided modes, V is preferably between 11.8 and 13.8. Max|DMGD| is preferably <150 ps/km and more preferably <120 ps/km, at λ, here 1550 nm. More generally, such values can be achieved for any central transmission wavelength $\lambda_C$ of any operating wavelength band for which the optical fiber is intended, such as the C-band, or the L-, S-, or U-band for example. Max|DMGD| is also preferably <300 ps/km and more preferably <250 ps/km from 1530 to 1570 nm. More generally, such values can be achieved for any operating wavelength band $[\lambda_C-\delta\lambda; \lambda_C+\delta\lambda]$ where $2\delta\lambda$ is a width of said operating band, preferably $\delta\lambda=20$ nm, such as the C-band, or the L-, S-, or U-band for example.

For FMFs supporting 16 LP guided modes, V is preferably between 13.8 and 15.9. Max|DMGD| is preferably <300 ps/km and more preferably <250 ps/km, at λ, here 1550 nm. More generally, such values can be achieved for any central transmission wavelength $\lambda_C$ of any operating wavelength band for which the optical fiber is intended, such as the C-band, or the L-, S-, or U-band for example. Max|DMGD| is also preferably <600 ps/km and more preferably <500 ps/km from 1530 to 1570 nm. More generally, such values can be achieved for any operating wavelength band $[\lambda_C-\delta\lambda; \lambda_C+\delta\lambda]$ where $2\delta\lambda$ is a width of said operating band, preferably $\delta\lambda=20$ nm, such as the C-band, or the L-, S-, or U-band for example.

Moreover, for FMFs supporting 4 LP guided modes, the normalized frequency V is preferably between 5.7 and 7.8. Max|DMGD| is preferably <20 ps/km, and more preferably <10 ps/km, at 1550 nm. More generally, such values can be achieved for any central transmission wavelength $\lambda_C$ of any operating wavelength band for which the optical fiber is intended, such as the C-band, or the L-, S-, or U-band for example. Max|DMGD| is also preferably <30 ps/km and more preferably <20 ps/km from 1530 to 1570 nm. More generally, such values can be achieved for any operating wavelength band $[\lambda_C-\delta\lambda; \lambda_C+\delta\lambda]$ where $2\delta\lambda$ is a width of said operating band, preferably $\delta\lambda=20$ nm, such as the C-band, or the L-, S-, or U-band for example.

All LP guided modes of FMFs according to an embodiment of the invention have effective areas, $A_{eff}<400$ μm², preferably <350 μm², and bend losses <100 dB/turn, preferably <50 dB/turn, at 10 mm bend radius at 1550 nm, and all LP leakage modes have leakage losses >0.1 dB/m, preferably >0.5 dB/m, at 1550 nm, so that they are cut-off after few tens of meters of propagation (>19.34 dB (Leakage) loss). As used herein, the effective area of an optical fiber is the area of the optical fiber in which light is propagated and is determined at the specified mode (e.g. $LP_{01}$), at a wavelength of 1550 nm, unless otherwise specified.

Table 1 gives the parameters of the index profiles of examples of FMFs according to the embodiment of FIG. 3B, and results on Max|DMGD|, specific core Criterion C and trench criterion T.

TABLE 1

|  | Ex. 0 | Ex. 1 | Ex. 2 | Ex. 3 | Ex. 4 | Ex. 5 | Ex. 6 | Ex. 7 | Ex. 8 | Ex. 9 | Ex. 10 |
| --- | --- | --- | --- | --- | --- | --- | --- | --- | --- | --- | --- |
| # Guided LP modes | 4 |  | 6 |  | 9 |  | 12 |  | 16 |  |  |
| Alpha | 1.9581 | 1.949 | 1.951 | 1.954 | 1.944 | 1.945 | 1.934 | 1.934 | 1.926 | 1.928 | 1.931 |
| R1 (μm) | 14.00 | 13.50 | 14.00 | 15.00 | 14.00 | 15.00 | 14.00 | 15.00 | 14.00 | 15.00 | 16.00 |
| Dn1 (×10³ at 1550 nm) | 6.31 | 10.69 | 9.95 | 8.66 | 14.4 | 12.55 | 19.65 | 17.13 | 26.02 | 22.7 | 19.06 |
| R2 (μm) | 15.88 | 14.66 | 15.30 | 16.56 | 15.05 | 16.12 | 14.91 | 15.44 | 14.68 | 15.98 | 16.63 |
| Dn2 (×10³ at 1550 nm) | 0 | 0 | 0 | 0 | 0.12 | 0 | −0.59 | 0 | −0.89 | −1.06 | 0.2 |
| R3 (μm) | 22.23 | 20.53 | 21.42 | 23.18 | 19.57 | 22.56 | 19.39 | 19.30 | 19.08 | 20.77 | 20.41 |
| Dn3 (×10³ at 1550 nm) | −4.81 | −4.81 | −4.81 | −4.81 | −5.78 | −4.81 | −5.78 | −3.85 | −5.78 | −5.78 | −4.81 |
| Max|DMGD| (ps/km) | 2.9 | 11.3 | 8.6 | 8.0 | 25.4 | 21.2 | 73.5 | 87.3 | 152.7 | 124.1 | 96.1 |
| Core Criterion | 15.3 | 15.3 | 11.6 | 10.8 | 11.3 | 9.4 | 12.9 | 15.2 | 11.5 | 9.3 | 8.3 |
| Trench Criterion | 37.8 | 55.0 | 57.4 | 62.1 | 73.7 | 87.6 | 99.6 | 57.3 | 129.8 | 141.5 | 88.7 |

In table 1, the core criterion is the C parameter such that $$C = 10 \cdot \frac{\text{Max}|DMGDs|}{(R_1^2 \cdot Dn_1)^3}.$$

The trench criterion T is defined as $T=1000 \cdot |(R_3-R_2) \cdot Dn_3 \cdot (R_1^2 \cdot Dn_1)|$. According to a preferred embodiment $55 \leq T \leq 150$. As can be noticed, for Example 0 of a FMF guiding 4 LP modes, the T criterion is not met, since T=37.8, although the C criterion is met with C=15.3<18. However, with such a "low" number of LP modes (i.e. 4), the trade-off between the bend losses and the leakage losses is much more easily met.

Table 2 gives the characteristics of the LP modes of the Examples of Table 1 supporting 4 LP guided modes, i.e. modes $LP_{01}$, $LP_{11}$, $LP_{21}$ and $LP_{02}$.

TABLE 2

| Ex. 0 | Dneff (×10⁻³) | Leakage Loss (dB/m) | $A_{\mathit{eff}}$ (µm²) | CD (ps/nm-km) | Bend Loss (dB/turn) | DMGD vs. LP01 (ps/km) |
|---|---|---|---|---|---|---|
| LP01 | 4.68 | / | 158 | 20.7 | 0.0 | / |
| LP11 | 3.01 | / | 213 | 20.9 | 0.0 | −2.4 |
| LP21 | 1.36 | / | 286 | 21.2 | 1.5 | 0.5 |
| LP02 | 1.37 | / | 323 | 21.3 | 4.8 | −1.5 |
| LP12 | <0 | 13.7 | | | | |
| LP31 | <0 | 2.4 | | | | |

In table 2, as well as in tables 3 to 6 disclosed below, Dneff stands for the effective index difference, CD stands for the chromatic dispersion expressed as ps/nm-km (chromatic dispersion is the sum of the material dispersion, the waveguide dispersion and the inter-modal dispersion), and Bend Losses, expressed as dB/turn, are given at 10 mm bend radius. $A_{\mathit{eff}}$ expressed as µm² designates the effective area of the LP guided mode. The Differential Mode Group Delay DMGD is measured with respect to the first guided mode $LP_{01}$ and expressed as ps/km. $LP_{12}$ and $LP_{31}$ are leaky modes.

Table 3 gives the characteristics of the LP modes of the Examples of Table 1 supporting 6 LP guided modes, that is to say Examples 1, 2 and 3, at a wavelength λ=1550 nm.

TABLE 3

| | Dneff (×10⁻³) | Leakage Loss (dB/m) | $A_{\mathit{eff}}$ (µm²) | CD (ps/nm-km) | Bend Loss (dB/turn) | DMGD vs. LP01 (ps/km) |
|---|---|---|---|---|---|---|
| Ex. 1 | | | | | | |
| LP01 | 8.50 | / | 117 | 20.0 | 0.0 | / |
| LP11 | 6.25 | / | 157 | 20.3 | 0.0 | −10.3 |
| LP21 | 4.01 | / | 211 | 20.5 | 0.0 | −8.5 |
| LP02 | 4.02 | / | 238 | 20.5 | 0.0 | −8.0 |
| LP12 | 1.79 | / | 254 | 20.7 | 6.5 | −7.6 |
| LP31 | 1.77 | / | 254 | 20.8 | 1.3 | 1.0 |
| LP03 | <0 | 53.4 | | | | |
| LP22 | <0 | 33.5 | | | | |
| LP41 | <0 | 3.0 | | | | |
| Ex. 2 | | | | | | |
| LP01 | 7.71 | / | 126 | 20.1 | 0.0 | / |
| LP11 | 5.62 | / | 169 | 20.4 | 0.0 | −7.6 |
| LP21 | 3.54 | / | 227 | 20.6 | 0.0 | −6.5 |
| LP02 | 3.55 | / | 256 | 20.6 | 0.0 | −7.8 |
| LP12 | 1.48 | / | 274 | 20.9 | 7.3 | −7.5 |
| LP31 | 1.46 | / | 273 | 20.9 | 1.6 | 0.8 |
| LP03 | <0 | 37.8 | | | | |
| LP22 | <0 | 21.4 | | | | |
| LP41 | <0 | 1.8 | | | | |
| Ex. 3 | | | | | | |
| LP01 | 6.70 | / | 144 | 20.3 | 0.0 | / |
| LP11 | 4.87 | / | 194 | 20.5 | 0.0 | −4.4 |
| LP21 | 3.06 | / | 260 | 20.7 | 0.0 | −4.3 |
| LP02 | 3.07 | / | 294 | 20.7 | 0.1 | −7.5 |
| LP12 | 1.27 | / | 314 | 21.1 | 7.6 | −5.2 |
| LP31 | 1.25 | / | 313 | 21.0 | 2.0 | 0.5 |
| LP03 | <0 | 17.4 | | | | |
| LP22 | <0 | 9.9 | | | | |
| LP41 | <0 | 0.9 | | | | |

$LP_{03}$, $LP_{22}$ and $LP_{41}$ are leaky modes.

Table 4 gives the characteristics of the LP modes of the Examples of Table 1 supporting 9 LP guided modes, that is to say Examples 4 and 5, at a wavelength λ=1550 nm. As can be observed, $LP_{13}$, $LP_{32}$ and $LP_{51}$ are leaky modes.

TABLE 4

| | Dneff (×10⁻³) | Leakage Loss (dB/m) | $A_{\mathit{eff}}$ (µm²) | CD (ps/nm-km) | Bend Loss (dB/turn) | DMGD vs. LP01 (ps/km) |
|---|---|---|---|---|---|---|
| Ex. 4 | | | | | | |
| LP01 | 11.75 | / | 104 | 19.3 | 0.0 | / |
| LP11 | 9.23 | / | 140 | 19.6 | 0.0 | −22.5 |
| LP21 | 6.72 | / | 188 | 20.0 | 0.0 | −25.1 |
| LP02 | 6.74 | / | 212 | 19.9 | 0.0 | −20.1 |
| LP12 | 4.24 | / | 227 | 20.3 | 0.0 | −24.3 |
| LP31 | 4.22 | / | 226 | 20.3 | 0.0 | −16.7 |
| LP03 | 1.76 | / | 311 | 20.4 | 12.0 | −16.1 |
| LP22 | 1.75 | / | 284 | 20.5 | 5.4 | −17.8 |
| LP41 | 1.72 | / | 260 | 20.6 | 1.0 | 0.3 |
| LP13 | <0 | 137.1 | | | | |
| LP32 | <0 | 47.4 | | | | |
| LP51 | <0 | 1.6 | | | | |
| Ex. 5 | | | | | | |
| LP01 | 10.41 | / | 119 | 19.6 | 0.0 | / |
| LP11 | 8.21 | / | 161 | 19.9 | 0.0 | −18.5 |
| LP21 | 6.03 | / | 215 | 20.2 | 0.0 | −21.2 |
| LP02 | 6.04 | / | 243 | 20.2 | 0.0 | −16.6 |
| LP12 | 3.87 | / | 260 | 20.4 | 0.0 | −21.1 |
| LP31 | 3.85 | / | 260 | 20.4 | 0.0 | −15.4 |
| LP03 | 1.71 | / | 357 | 20.6 | 9.8 | −15.6 |
| LP22 | 1.69 | / | 326 | 20.6 | 2.9 | −17.1 |
| LP41 | 1.67 | / | 298 | 20.7 | 0.7 | −3.3 |
| LP13 | <0 | 31.2 | | | | |
| LP32 | <0 | 11.4 | | | | |
| LP51 | <0 | 0.5 | | | | |

Table 5 gives the characteristics of the LP modes of the Examples of Table 1 supporting 12 LP guided modes (examples 6 and 7). $LP_{04}$, $LP_{23}$, $LP_{42}$ and $LP_{61}$ are leaky modes.

TABLE 5

| | Dneff (×10⁻³) | Leakage Loss (dB/m) | $A_{\mathit{eff}}$ (µm²) | CD (ps/nm-km) | Bend Loss (dB/turn) | DMGD vs. LP01 (ps/km) |
|---|---|---|---|---|---|---|
| Ex. 6 | | | | | | |
| LP01 | 16.58 | / | 89 | 18.4 | 0.0 | / |
| LP11 | 13.63 | / | 119 | 18.8 | 0.0 | −53.2 |
| LP21 | 10.69 | / | 160 | 19.1 | 0.0 | −73.5 |
| LP02 | 10.72 | / | 181 | 19.1 | 0.0 | −60.9 |
| LP12 | 7.80 | / | 193 | 19.5 | 0.0 | −64.8 |
| LP31 | 7.77 | / | 193 | 19.5 | 0.0 | −70.6 |
| LP03 | 4.90 | / | 266 | 19.8 | 0.0 | −27.5 |
| LP22 | 4.89 | / | 242 | 19.9 | 0.0 | −38.5 |
| LP41 | 4.85 | / | 221 | 19.9 | 0.0 | −45.3 |
| LP13 | 2.00 | / | 260 | 19.0 | 5.8 | −68.4 |
| LP32 | 1.98 | / | 283 | 19.6 | 2.2 | −31.3 |
| LP51 | 1.94 | / | 247 | 20.2 | 0.2 | −5.8 |
| LP04 | <0 | 218.5 | | | | |
| LP23 | <0 | 149.9 | | | | |
| LP42 | <0 | 31.9 | | | | |
| LP61 | <0 | 0.6 | | | | |
| Ex. 7 | | | | | | |
| LP01 | 14.63 | / | 102 | 18.8 | 0.0 | / |
| LP11 | 12.05 | / | 137 | 19.1 | 0.0 | −48.2 |
| LP21 | 9.49 | / | 184 | 19.5 | 0.0 | −68.6 |
| LP02 | 9.52 | / | 208 | 19.5 | 0.0 | −56.5 |
| LP12 | 6.97 | / | 222 | 19.9 | 0.0 | −52.1 |

TABLE 5-continued

| | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP31 | 6.94 | / | 222 | 19.8 | 0.0 | −66.4 |
| LP03 | 4.44 | / | 304 | 20.1 | 0.0 | 18.1 |
| LP22 | 4.43 | / | 278 | 20.2 | 0.0 | −2.6 |
| LP41 | 4.40 | / | 254 | 20.2 | 0.0 | −37.0 |
| LP13 | 1.90 | / | 298 | 17.4 | 77.5 | −69.2 |
| LP32 | 1.89 | / | 324 | 19.0 | 20.7 | −3.7 |
| LP51 | 1.86 | / | 283 | 20.3 | 2.8 | 6.7 |
| LP04 | <0 | 1077.0 | | | | |
| LP23 | <0 | 750.2 | | | | |
| LP42 | <0 | 145.0 | | | | |
| LP61 | <0 | 3.0 | | | | |

Table 6 gives the characteristics of the LP modes of the Examples of Table 1 supporting 16 LP guided modes (examples 8, 9 and 10). $LP_{14}$, $LP_{33}$, $LP_{52}$ and $LP_{71}$ are leaky modes

TABLE 6

| Ex. 8 | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP01 | 22.50 | / | 76 | 17.2 | 0.0 | / |
| LP11 | 19.10 | / | 103 | 17.6 | 0.0 | −88.8 |
| LP21 | 15.72 | / | 139 | 18.1 | 0.0 | −131.5 |
| LP02 | 15.75 | / | 157 | 18.0 | 0.0 | −112.3 |
| LP12 | 12.39 | / | 168 | 18.5 | 0.0 | −133.6 |
| LP31 | 12.35 | / | 167 | 18.5 | 0.0 | −142.9 |
| LP03 | 9.06 | / | 230 | 19.0 | 0.0 | −83.8 |
| LP22 | 9.04 | / | 210 | 19.0 | 0.0 | −104.8 |
| LP41 | 8.99 | / | 192 | 19.0 | 0.0 | −121.8 |
| LP13 | 5.72 | / | 225 | 19.3 | 0.0 | −34.2 |
| LP32 | 5.69 | / | 245 | 19.5 | 0.0 | −43.8 |
| LP51 | 5.64 | / | 214 | 19.6 | 0.0 | −67.9 |
| LP04 | 2.39 | / | 301 | 16.8 | 6.4 | −106.8 |
| LP23 | 2.37 | / | 272 | 17.5 | 2.2 | −80.2 |
| LP42 | 2.34 | / | 276 | 19.0 | 0.4 | −8.2 |
| LP61 | 2.29 | / | 234 | 19.9 | 0.0 | 9.8 |
| LP14 | <0 | 271.8 | | | | |
| LP33 | <0 | 125.1 | | | | |
| LP52 | <0 | 11.8 | | | | |
| LP71 | <0 | 0.2 | | | | |

| Ex. 9 | Dneff (×10⁻³) | LL (dB/m) | Aeff (μm²) | CD (ps/nm-km) | BL (dB/turn) | DMGD (ps/km) |
|---|---|---|---|---|---|---|
| LP01 | 19.61 | / | 88 | 17.8 | 0.0 | 0 |
| LP11 | 16.65 | / | 119 | 18.2 | 0.0 | −73.7 |
| LP21 | 13.70 | / | 159 | 18.5 | 0.0 | −110.7 |
| LP02 | 13.73 | / | 180 | 18.5 | 0.0 | −94.6 |
| LP12 | 10.80 | / | 192 | 18.9 | 0.0 | −117.5 |
| LP31 | 10.77 | / | 192 | 18.9 | 0.0 | −124.1 |
| LP03 | 7.89 | / | 264 | 19.4 | 0.0 | −85.1 |
| LP22 | 7.87 | / | 241 | 19.4 | 0.0 | −102.0 |
| LP41 | 7.84 | / | 220 | 19.4 | 0.0 | −113.4 |
| LP13 | 4.98 | / | 258 | 19.6 | 0.0 | −59.7 |
| LP32 | 4.95 | / | 281 | 19.7 | 0.0 | −64.5 |
| LP51 | 4.91 | / | 246 | 19.8 | 0.0 | −78.7 |
| LP04 | 2.07 | / | 345 | 18.1 | 6.5 | −106.0 |
| LP23 | 2.06 | / | 312 | 18.6 | 3.3 | −91.4 |
| LP42 | 2.03 | / | 317 | 19.5 | 0.9 | −42.7 |
| LP61 | 1.99 | / | 269 | 20.1 | 0.1 | −26.8 |
| LP14 | <0 | 123.0 | | | | |
| LP33 | <0 | 57.0 | | | | |
| LP52 | <0 | 5.4 | | | | |
| LP71 | <0 | 0.1 | | | | |

| Ex. 10 | Dneff (×10⁻³) | Leakage Loss (dB/m) | $A_{eff}$ (μm²) | CD (ps/nm-km) | Bend Loss (dB/turn) | DMGD vs. LP01 (ps/km) |
|---|---|---|---|---|---|---|
| LP01 | 16.58 | / | 102 | 18.5 | 0.0 | / |
| LP11 | 14.03 | / | 138 | 18.8 | 0.0 | −51.3 |
| LP21 | 11.50 | / | 186 | 19.1 | 0.0 | −82.6 |
| LP02 | 11.52 | / | 210 | 19.1 | 0.0 | −77.7 |
| LP12 | 9.00 | / | 224 | 19.4 | 0.0 | −90.4 |
| LP31 | 8.97 | / | 224 | 19.4 | 0.0 | −96.1 |
| LP03 | 6.50 | / | 308 | 19.8 | 0.0 | −67.2 |
| LP22 | 6.49 | / | 281 | 19.8 | 0.0 | −75.7 |
| LP41 | 6.46 | / | 257 | 19.8 | 0.0 | −89.8 |
| LP13 | 4.00 | / | 301 | 20.2 | 0.0 | −11.5 |

TABLE 6-continued

| | | | | | | |
|---|---|---|---|---|---|---|
| LP32 | 3.98 | / | 327 | 20.2 | 0.0 | −29.6 |
| LP51 | 3.94 | / | 286 | 20.2 | 0.0 | −60.6 |
| LP04 | 1.50 | / | 401 | 16.9 | 221.3 | −82.0 |
| LP23 | 1.49 | / | 364 | 17.9 | 73.4 | −48.5 |
| LP42 | 1.46 | / | 368 | 19.6 | 27.1 | 0.0 |
| LP61 | 1.43 | / | 312 | 20.4 | 2.1 | −12.3 |
| LP14 | <0 | 916.3 | | | | |
| LP33 | <0 | 522.3 | | | | |
| LP52 | <0 | 100.4 | | | | |
| LP71 | <0 | 1.9 | | | | |

FIG. 6 illustrates the evolution of Max|DMGD| as a function of wavelength for few-mode fibers supporting from 6 to 16 LP guided modes. More precisely, FIG. 6 shows the Max|DMGD| as a function of wavelength for Ex. 2, 5, 6 & 9 listed in Table 1. Such examples correspond to few-mode fiber according to the second embodiment of the invention, as depicted in FIG. 3B.

The x-axis depicts the wavelength of the light guided by the fiber, ranging from 1530 to 1570 nm. The y-axis depicts the Max|DMGD| between any two LP guided modes, expressed as ps/km and ranging from 0 to 200. Curve 51 corresponds to the FMF guiding 6 LP modes of Example 2; curve 52 corresponds to the FMF guiding 9 LP modes of Example 5; curve 53 corresponds to the FMF guiding 12 LP modes of Example 6, while curve 54 corresponds to the FMF guiding 16 LP modes of Example 9.

As can be seen, the Max|DMGD| remains low in the entire extended C-band from 1530 to 1570 nm. The Max|DMGD| slope in this extended C-band is in absolute value <3 ps/km/nm, preferably <2 ps/km/nm, and more preferably <1 ps/km/nm.

FIG. 7 depicts the evolution of Max|DMGD| for FMFs supporting from 6 to 16 LP guided modes as a function of the α parameter of the graded-index profile. More precisely, FIG. 7 shows the Max|DMGD| as a function of α for Ex. 2, 4, 7 & 8 listed in Table 1. Such examples correspond to few-mode fiber according to the second embodiment of the invention, as depicted in FIG. 3B.

The x-axis depicts the value of α, which is a non-dimensional parameter that defines the index profile shape of the graded-index optical core, with α ranging from 1.91 to 1.99. The y-axis depicts the Max|DMGD| between any two LP guided modes, expressed as ps/km and ranging from 0 to 200. Curve 61 corresponds to the FMF guiding 6 LP modes of Example 2; curve 62 corresponds to the FMF guiding 9 LP modes of Example 4; curve 63 corresponds to the FMF guiding 12 LP modes of Example 7, while curve 64 corresponds to the FMF guiding 16 LP modes of Example 8.

As shown on FIG. 7, there are optimum values for α, for which these Max|DMGD| have minimum values. α lower and higher than these "optimum α" generally exhibit DMGDs with opposite signs.

By carefully choosing the value of α, as close as possible to the optimum, it is possible to design a few-mode fiber minimizing the Max|DMGD| value. The few mode optical fibers 10 according to the disclosure have a low loss and a small differential group delay, and are suitable for use in optical transmission systems, particularly those that utilize space-division multiplexing and that are configured for long-haul transmission.

6.2 Few-Mode Optical Fibers Link

As mentioned above, there are optimum values for α, for which Max|DMGD| have minimum values, and a lower and higher than these "optimum α" generally exhibit DMGDs with opposite signs.

As a consequence, the inventors have reached the conclusion that, if a FMF is off-target in term of a (i.e. if the α-value of the FMF is either slightly higher or lower than the "optimum α" shown on FIG. 7), it is possible to associate it with another FMF showing an appropriate a (i.e. either higher than the "optimum α" if the off-target α is smaller, or smaller than the "optimum α" if the off-target α is higher), by choosing the appropriate lengths for both FMFs, in order to realize a "DMGD-compensated" link.

The resulting Max|DMGD| of the link can then be very close to the minimum value shown on FIG. 7. This association can, for instance, compensate for process variability that may result in FMFs with slightly off-target Alphas.

Tables 6, 7, 8 & 9 show examples of these associations for FMFs supporting 6, 9, 12 and 16 LP guided modes, respectively.

TABLE 6

| Ex. 2 | $\text{Alpha}_{Opt}$ 1.951 DMGD vs. LP01 (ps/km) | $\text{Alpha}_{Off\text{-}Target}$ 1.956 DMGD vs. LP01 (ps/km) | $\text{Alpha}_{Comp}$ 1.910 DMGD vs. LP01 (ps/km) | Combination of Alphas with $L_{Comp}/L_{Opt}$ = 0.128 DMGD vs. LP01 (ps/km) |
|---|---|---|---|---|
| LP01 | / | / | / | / |
| LP11 | −7.6 | 1.6 | −81.6 | −7.9 |
| LP21 | −6.5 | 11.7 | −151.8 | −6.9 |
| LP02 | −7.8 | 10.1 | −150.3 | −8.1 |
| LP12 | −7.5 | 17.5 | −206.1 | −7.9 |
| LP31 | 0.8 | 27.2 | −209.7 | 0.3 |
| Max|DMGD| (ps/km) | 8.6 | 27.2 | 209.7 | 8.4 |

Table 6 shows the values of DMGDs and Max|DMGD|, expressed as ps/km, at a wavelength λ=1550 nm for few-mode fibers supporting 6 LP guided modes according to example 2 (already discussed in Table 1 and Table 2). According to the results shown on FIG. 7, the optimum value of a for such a FMF is $\alpha_{opt}$=1.951. Column 2 of table 6 gives the values of DMGDs and Max|DMGD| at a wavelength λ=1550 nm for a FMF according to Example 2 showing an optimum value of α. Column 3 of table 6 gives the values of DMGDs and Max|DMGD| at a wavelength λ=1550 nm for a FMF according to Example 2, which would show a slightly off-target α, for example $\alpha_{off\text{-}target}$=1.956.

Column 4 of table 6 gives the values of DMGDs and Max|DMGD| at a wavelength λ=1550 nm for a FMF according to Example 2, which would show a value of α, for example $\alpha_{comp}$=1.910, which could be used in concatenation with the FMF of column 3, to build a DMGD-compensated optical link.

The last column in table 6 gives the values of DMGDs and Max|DMGD| at a wavelength λ=1550 nm for an optical link built by concatenating the FMF in column 3 with a length $L_{opt}$ and the FMF in column 4 with a length $L_{comp}$. The total length of the link is $L_{link}=L_{opt}+L_{comp}$, where $L_{opt}$ and $L_{comp}$ are such that $L_{comp}/L_{opt}$=0.128.

Such a ratio is chosen so as to be equal to, or very close to, the ratio of the absolute values of the DMGDs of the modes having the highest DMGDs values for both fibers in the link. In example 2 disclosed in table 6, such a highest mode is the $LP_{31}$ mode, for which the ratio of the absolute values of the DMGDs for both fibers in the optical link is |27.2/−209.7|=0.13. In this embodiment, we choose a ratio of the optical fibers lengths close to 0.13, such that $L_{comp}/L_{opt}$=0.128. The lengths $L_{opt}$ and $L_{comp}$ are hence chosen so as to minimize Max|DMGD| on the optical link.

As shown in table 6, the values of DMGDs and Max|DMGD| for the DMGD-compensated optical link are hence very close to the minimum values. Such an optical link allows guiding six LP modes, with a very low DGMD, and thus a very good system reach.

Such an optical link meets the core criterion C<18, and is made up of two FMFs, which both individually meet the core criterion C<18.

According to the results shown on FIG. 7, the optimum value of α for such a FMF is $\alpha_{opt}$=1.944. Column 2 of table 7 gives the values of DMGDs and Max|DMGD| at a wavelength λ=1550 nm for a FMF according to Example 4 showing an optimum value of α. Column 3 of table 7 gives the values of DMGDs and Max|DMGD| at a wavelength λ=1550 nm for a FMF according to Example 4, which would show a slightly off-target α, for example $\alpha_{off\text{-}target}$=1.938.

Column 4 of table 7 gives the values of DMGDs and Max|DMGD| at a wavelength λ=1550 nm for a FMF according to Example 4, which would show a value of α, for example $\alpha_{comp}$=1.990, which could be used in concatenation with the FMF of column 3, to build a DMGD-compensated optical link.

The last column in table 7 gives the values of DMGDs and Max|DMGD| at a wavelength λ=1550 nm for an optical link built by concatenating the FMF in column 3 with a length $L_{opt}$ and the FMF in column 4 with a length $L_{comp}$. The total length of the link is $L_{link}=L_{opt}+L_{comp}$, where $L_{opt}$ and $L_{comp}$ are such that $L_{comp}/L_{opt}$=0.134.

Such a ratio is chosen equal to, or very close to, the ratio of the absolute values of the DMGDs of the modes having the highest DMGDs values for both fibers in the link. In example 4 disclosed in table 7, such a highest mode is the $LP_{41}$ mode, for which the ratio of the absolute values of the DMGDs for both fibers in the optical link is |−50.7/377.1|=0.13. In this embodiment, we choose a ratio of the optical fibers lengths close to 0.13, such that $L_{comp}/L_{opt}$=0.134. The lengths $L_{opt}$ and $L_{comp}$ are hence chosen so as to minimize Max|DMGD| on the optical link.

As shown in table 7, the values of DMGDs and Max|DMGD| for the DMGD-compensated optical link are hence very close to the minimum values. Such an optical link allows guiding nine LP modes, with a very low DGMD, and thus a very good system reach.

TABLE 7

| Ex. 4 | $Alpha_{Opt}$ 1.944 DMGD vs. LP01 (ps/km) | $Alpha_{Off\text{-}Target}$ 1.938 DMGD vs. LP01 (ps/km) | $Alpha_{Comp}$ 1.990 DMGD vs. LP01 (ps/km) | Combination of Alphas with $L_{Comp}/L_{Opt}$ = 0.134 DMGD vs. LP01 (ps/km) |
|---|---|---|---|---|
| LP01 | / | / | / | / |
| LP11 | −22.5 | −35.7 | 74.6 | −22.7 |
| LP21 | −25.1 | −51.4 | 168.2 | −25.4 |
| LP02 | −20.1 | −46.2 | 172.4 | −20.4 |
| LP12 | −24.3 | −62.6 | 259.1 | −24.6 |
| LP31 | −16.7 | −55.7 | 270.9 | −17.1 |
| LP03 | −16.1 | −63.6 | 337.2 | −16.2 |
| LP22 | −17.8 | −66.4 | 342.9 | −18.0 |
| LP41 | 0.3 | −50.7 | 377.1 | −0.1 |
| Max|DMGD| (ps/km) | 25.4 | 66.4 | 302.5 | 25.4 |

Table 7 shows the values of DMGDs and Max|DMGD|, expressed as ps/km, at a wavelength λ=1550 nm for few-mode fibers supporting 9 LP guided modes according to example 4 (already discussed in Table 1 and Table 3).

Such an optical link meets the core criterion C<18, and is made up of two FMFs, which both individually meet the core criterion C<18.

TABLE 8

| Ex. 7 | $Alpha_{Opt}$ 1.934 DMGD vs. LP01 (ps/km) | $Alpha_{Off\text{-}Target}$ 1.942 DMGD vs. LP01 (ps/km) | $Alpha_{Comp}$ 1.900 DMGD vs. LP01 (ps/km) | Combination of Alphas with $L_{Comp}/L_{Opt}$ = 0.230 DMGD vs. LP01 (ps/km) |
|---|---|---|---|---|
| LP01 | / | / | / | / |
| LP11 | −48.2 | −30.4 | −125.6 | −48.2 |
| LP21 | −68.6 | −33.2 | −222.0 | −68.5 |
| LP02 | −56.5 | −21.3 | −208.7 | −56.3 |

TABLE 8-continued

| Ex. 7 | $Alpha_{Opt}$ 1.934 DMGD vs. LP01 (ps/km) | $Alpha_{Off\text{-}Target}$ 1.942 DMGD vs. LP01 (ps/km) | $Alpha_{Comp}$ 1.900 DMGD vs. LP01 (ps/km) | Combination of Alphas with $L_{Comp}/L_{Opt} = 0.230$ DMGD vs. LP01 (ps/km) |
|---|---|---|---|---|
| LP12 | −52.1 | 0.2 | −278.0 | −51.8 |
| LP31 | −66.4 | −13.7 | −294.6 | −66.2 |
| LP03 | 18.1 | 86.1 | −274.9 | 18.6 |
| LP22 | −2.6 | 65.9 | −298.1 | −2.1 |
| LP41 | −37.0 | 32.7 | −338.1 | −36.6 |
| LP13 | −69.2 | 13.7 | −425.5 | −68.5 |
| LP32 | −3.7 | 80.3 | −365.5 | −3.0 |
| LP51 | 6.7 | 92.9 | −365.0 | 7.2 |
| Max\|DMGD\| (ps/km) | 87.3 | 126.1 | 425.5 | 87.1 |

Table 8 shows the values of DMGDs and Max|DMGD|, expressed as ps/km, at a wavelength λ=1550 nm for few-mode fibers supporting 12 LP guided modes according to example 7 (already discussed in Table 1 and Table 4). According to the results shown on FIG. 7, the optimum value of α for such a FMF is $\alpha_{opt}$=1.934. Column 2 of table 8 gives the values of DMGDs and Max|DMGD| at a wavelength λ=1550 nm for a FMF according to Example 7 showing an optimum value of α. Column 3 of table 8 gives the values of DMGDs and Max|DMGD| at a wavelength λ=1550 nm for a FMF according to Example 7, which would show a slightly off-target α, for example $\alpha_{off\text{-}target}$=1.942.

Column 4 of table 8 gives the values of DMGDs and Max|DMGD| at a wavelength λ=1550 nm for a FMF according to Example 7, which would show a value of α, for example $\alpha_{comp}$=1.900, which could be used in concatenation with the FMF of column 3, to build a DMGD-compensated optical link.

The last column in table 8 gives the values of DMGDs and Max|DMGD| at a wavelength λ=1550 nm for an optical link built by concatenating the FMF in column 3 with a length $L_{opt}$ and the FMF in column 4 with a length $L_{comp}$. The total length of the link is $L_{link}=L_{opt}+L_{comp}$, where $L_{opt}$ and $L_{comp}$ are such that $L_{comp}/L_{opt}$=0.230.

Such a ratio is chosen equal to, or very close to, the ratio of the absolute values of the DMGDs of the modes having the highest DMGDs values for both fibers in the link. In example 7 disclosed in table 8, such a highest mode is the LP$_{51}$ mode, for which the ratio of the absolute values of the DMGDs for both fibers in the optical link is |92.9/−365.0|=0.25. In this embodiment, we choose a ratio of the optical fibers lengths close to 0.25, such that $L_{comp}/L_{opt}$=0.230. The lengths $L_{opt}$ and $L_{comp}$ are hence chosen so as to minimize Max|DMGD| on the optical link.

As shown in table 8, the values of DMGDs and Max|DMGD| for the DMGD-compensated optical link are very close to the minimum values. Such an optical link allows guiding twelve LP modes, with a very low DGMD, and thus a very good system reach.

Such an optical link meets the core criterion C<18, and is made up of two FMFs, which both individually meet the core criterion C<18.

TABLE 9

| Ex. 8 | $Alpha_{Opt}$ 1.926 DMGD vs. LP01 (ps/km) | $Alpha_{Off\text{-}Target}$ 1.916 DMGD vs. LP01 (ps/km) | $Alpha_{Comp}$ 1.990 DMGD vs. LP01 (ps/km) | Combination of Alphas with $L_{Comp}/L_{Opt} = 0.150$ DMGD vs. LP01 (ps/km) |
|---|---|---|---|---|
| LP01 | / | / | / | / |
| LP11 | −88.8 | −118.7 | 94.4 | −90.9 |
| LP21 | −131.5 | −190.7 | 233.4 | −135.4 |
| LP02 | −112.3 | −171.2 | 251.7 | −116.0 |
| LP12 | −133.6 | −221.5 | 411.6 | −139.0 |
| LP31 | −142.9 | −231.2 | 403.6 | −148.5 |
| LP03 | −83.8 | −199.8 | 638.7 | −90.5 |
| LP22 | −104.8 | −221.2 | 619.2 | −111.6 |
| LP41 | −121.8 | −239.1 | 604.9 | −129.0 |
| LP13 | −34.2 | −176.4 | 854.4 | −42.0 |
| LP32 | −43.8 | −187.4 | 852.3 | −51.9 |
| LP51 | −67.9 | −213.5 | 837.5 | −76.5 |
| LP04 | −106.8 | −270.8 | 922.4 | −115.2 |
| LP23 | −80.2 | −245.7 | 957.3 | −88.9 |
| LP42 | −8.2 | −177.3 | 1049.5 | −17.4 |
| LP61 | 9.8 | −163.6 | 1090.3 | −0.1 |
| Max\|DMGD\| (ps/km) | 152.7 | 270.8 | 1090.3 | 148.5 |

Table 9 shows the values of DMGDs and Max|DMGD|, expressed as ps/km, at a wavelength λ=1550 nm for few-mode fibers supporting 16 LP guided modes according to example 8 (already discussed in Table 1 and Table 5). According to the results shown on FIG. 7, the optimum value of α for such a FMF is $\alpha_{opt}$=1.926. Column 2 of table 9 gives the values of DMGDs and Max|DMGD| at a wavelength λ=1550 nm for a FMF according to Example 8 showing an optimum value of α. Column 3 of table 9 gives the values of DMGDs and Max|DMGD| at a wavelength λ=1550 nm for a FMF according to Example 8, which would show a slightly off-target α, for example $\alpha_{off\text{-}target}=1.916$.

Column 4 of table 9 gives the values of DMGDs and Max|DMGD| at a wavelength λ=1550 nm for a FMF according to Example 8, which would show a value of α, for example $\alpha_{comp}=1.990$, which could be used in concatenation with the FMF of column 3, to build a DMGD-compensated optical link.

The last column in table 9 gives the values of DMGDs and Max|DMGD| at a wavelength λ=1550 nm for an optical link built by concatenating the FMF in column 3 with a length $L_{opt}$ and the FMF in column 4 with a length $L_{comp}$. The total length of the link is $L_{link}=L_{opt}+L_{comp}$, where $L_{opt}$ and $L_{comp}$ are such that $L_{comp}/L_{opt}=0.150$.

Such a ratio is chosen equal to, or very close to, the ratio of the absolute values of the DMGDs of the modes having the highest DMGDs values for both fibers in the link. In example 7 disclosed in table 9, such a highest mode is the $LP_{61}$ mode, for which the ratio of the absolute values of the DMGDs for both fibers in the optical link is |−163.6/1090.3|=0.15. In this embodiment, we choose a ratio of the optical fibers lengths that equals 0.15, such that $L_{comp}/L_{opt}=0.150$. The lengths $L_{opt}$ and $L_{comp}$ are hence chosen so as to minimize Max|DMGD| on the optical link.

As shown in table 9, the values of DMGDs and Max|DMGD| for the DMGD-compensated optical link are very close to the minimum values. Such an optical link allows guiding sixteen LP modes, with a very low DGMD, and thus a very good system reach.

Such an optical link meets the core criterion C<18, and is made up of two FMFs, which both individually meet the core criterion C<18.

The examples of optical links described above in relation to tables 6, 7, 8 and 9 are hence all built by concatenating two FMFs having the same overall refractive index profile, according to any of the embodiments of FIGS. 3A to 3C, having the same radii $R_1$, $R_2$ and $R_3$ and index differences $Dn_1$, $Dn_2$ and $Dn_3$, but having slightly different values of α, one with a value of a slightly lower than the optimum α, and one with a value of a slightly higher than the optimum α, so that the DMGDs with opposite signs can compensate each other. It is thus possible to build a DMGD-compensated link with robust features.

However, according to another embodiment, it is also possible to concatenate more than two FMFs: as long as at least two of them guide at least one mode with DMGDs showing opposite signs, compensation can occur to build a DMGD-compensated link.

Moreover, according to another embodiment, it is also possible to concatenate FMFs having the same value for α, but having different values of $R_1$ or of $Dn_1$ for example. The same DMGD compensation can occur by choosing the appropriate optical fiber lengths.

It is also possible, according to another embodiment, to associate few-mode fibers showing different refractive index profiles, such as, as a mere example, by combining a few-mode fiber according to Example 1 with a few-mode fiber according to Example 3, or even by combining a FMF according to Example 8 with a FMF according to Example 10.

More generally, it is possible to associate FMFs having any of the refractive index profiles of FIGS. 3A to 3C. It is also possible to associate one or several FMFs having one of the refractive index profiles of FIGS. 3A to 3C, with any other FMF having an optical core with a single α graded-index profile and an optical cladding comprising a trench.

It is also possible to associate in an optical link several optical fibers, which individually satisfy the criteria $R_{1i} \geq 13.5$ μm and C≤18, or which do not individually satisfy such criteria, or for which one, or several of them only, individually satisfy such criteria.

As long as the appropriate lengths of optical fibers are carefully chosen, such that the optical link meets the criterion $$C = 10 \cdot \frac{\text{Max} \,|\, DMGD_{link} \,|}{(R_{1link}^2 \cdot Dn_{1link})^3} \leq 18,$$

any association of any number of any type of FMFs is possible to build a DMGD-compensated optical link.

FIGS. 8A and 8B illustrate embodiments of an optical system according to the invention. According to the first embodiment in FIG. 8A, such an optical system comprises transceivers 81 and receivers 85 optically connected by an optical fiber link 70 that includes at least two spans of fiber. Transceivers 81 comprise light sources (such as lasers) and generate n LP modes, referenced 1, 2, . . . , n used in the optical system of FIG. 8A. A mode multiplexer 82 multiplexes the n LP modes and is optically connected to optical link 70, which guides the n multiplexed LP modes, towards a mode demultiplexer 83, which is optically connected to the end of optical link 70.

Mode demultiplexer 83 demultiplexes the n multiplexed LP modes, and feeds each LP mode into an amplifier 84. At the output of amplifiers 84, LP modes enter receivers 85.

Such an optical system may comprise M optical links. In an example, M=1; in another example, M=2; in another example M=5; in yet another example, M=10. In case the optical system comprises M optical links, it also comprises M mode multiplexers 82, M mode demultiplexers 83, and M amplifiers 84 for each LP mode guided by the optical system.

The embodiment in FIG. 8B differs from the first embodiment in FIG. 8A in that amplifier 84 amplifies all LP modes guided by the optical link 70; as such, amplifier 84 is optically connected between the output of optical link 70 and the input of mode demultiplexer 83. In this second embodiment, when the optical system comprises M optical links, it also comprises M amplifiers 84; however, there is only one mode multiplexer 82, optically connected between transceivers 81 an optical link 70, and only one mode demultiplexer 83, optically connected between amplifier 84 and receivers 85.

The embodiments of FIGS. 8A and 8B are given as mere examples, and an optical link according to the invention may of course be used in any other kind of optical system.

The invention claimed is:

1. An optical link comprising N optical fibers, with N≥2, N being an integer,
    each optical fiber comprising an optical core and an optical cladding surrounding the optical core, the optical core having a single $\alpha_i$ graded-index profile with $\alpha_i \geq 1$, $x_i$ being a non-dimensional parameter defining an index profile shape of the optical core, and the optical core having a radius $R_{1i}$, expressed in microns (μm), and a maximal refractive index $n_{0i}$, where i∈[[1;N]] is an index designating said optical fiber,
    wherein the optical cladding having a refractive index $n_{Cli}$ at an outer edge of the optical cladding,
    wherein said optical cladding comprises a region of depressed refractive index $n_{trenchi}$ being a trench, surrounding the optical core, said trench having an inner radius $R_{2i}$, with $R_{2i} \geq R_{1i}$, and an outer radius $R_{3i}$, with $R_{3i} > R_{2i}$, said optical link having an average optical core radius $R_{1link}$ satisfying a criterion C of quality of optical communications defined by the following equation:

$$C = 10 \cdot \frac{\text{Max} | DMGD_{link} |}{(R_{1link}^2 \cdot Dn_{1link})^3}$$

where $DMGD_{link}$ is the Differential Mode Group Delay between two guided modes in said optical link, where $|\text{Max}|DMGD_{link}|$ is expressed in ps/km and is an absolute maximum value of Differential Mode Group Delay between any combination of guided modes in said optical link, where $$R_{1link} = \frac{\sum_{i=1}^{N} R_{1i} L_i}{\sum_{i=1}^{N} L_i}$$

with $L_i$ a length of optical fiber i in said link, and where $$Dn_{1link} = \frac{\sum_{i=1}^{N} Dn_{1i} L_i}{\sum_{i=1}^{N} L_i}$$

with $Dn_{1i} = n_{0i} - n_{Cli}$ is a core-cladding index difference for optical fiber t, at $\lambda = \lambda_C$, where $\lambda_C$ is a central transmission wavelength of an operating band for the optical fiber, and for at least one optical fiber i in said link, said optical core radius $R_{1i}$ is chosen such that $R_{1i} \geq 13.5$ μm and for all optical fibers i∈[[1;N]] in said link, said length $L_i$ are chosen such that C≤18, and wherein at least one of said optical fibers has trench parameters $55 \leq 1000 \cdot |(R_{3i} - R_{2i}) \cdot Dn_{3i} \cdot (R_{1i}^2 \cdot Dn_{1i})| \leq 150$ with $R_{1i}$, $R_{2i}$, and $R_{3i}$ each being expressed in microns (μm), and where $Dn_{3i} = n_{trenchi} - n_{Cli}$ is the trench-cladding index difference at $\lambda = \lambda_C$.

2. The optical link according to claim 1, wherein $Dn_3 \leq -3 \cdot 10^3$.

3. The optical link according to claim 1, wherein at least one of said optical fibers has an optical core radius $R_{1i}$ and an $\alpha_i$-value of said graded index profile such that:

$$C = 10 \cdot \frac{\text{Max} | DMGD_i |}{(R_{1i}^2 \cdot Dn_{1i})^3} \leq 18$$

where $DMGD_i$ is the Differential Mode Group Delay between two guided modes in said optical fiber, where $\text{Max}|DMGD_i|$ is the absolute maximum value of DMGD between any combination of guided modes in said optical fiber, and where $Dn_{1i} = n_{0i} - n_{Cli}$ is the core-cladding index difference at $\lambda = \lambda_C$ for said optical fiber.

4. The optical link according to claim 3, wherein said optical fiber is $R_{1i} \leq 20$ μm.

5. The optical link according to claim 1, wherein the optical link guides 4 to 16 LP modes.

6. The optical link according to claim 1, wherein the optical link guides 6 to 16 LP modes.

7. The optical link according to claim 1, wherein for all optical fibers i∈[[1;N]] in said link, said lengths $L_i$ are chosen so as to minimize $\text{Max}|DMGD_{link}|$ on said link.

8. The optical link according to claim 1, wherein at least two optical fibers in said link have $DMGD_i$ showing opposite signs for at least one mode guided by said optical fibers, where $DMGD_i$ is the Differential Mode Group Delay between said one mode and any other guided mode in optical fiber i.

9. The optical link according to claim 1, wherein, for at least one of said fibers i∈[[1;N]] in said optical link, said optical core has a minimal refractive index $n_{1i} = n_{Cli}$, and said optical cladding also comprises an inner cladding layer directly surrounding said optical core, with an inner radius $R_{1i}$ and an outer radius $R_{2i} \geq R_{1i}$, said inner cladding layer having a constant refractive index $n_{2i}$, such that $n_{2i} \neq n_{Cli}$ and $n_{2i} \geq n_{trenchi}$.

10. The optical link according to claim 1, wherein, for at least one of said fibers i∈[[1;N]] in said optical link, said optical core has a minimal refractive index $n_{1i} \neq n_{Cli}$, and said optical cladding also comprises an inner cladding layer directly surrounding said optical core, with an inner radius $R_{1i}$ and an outer radius $R_{2i} \geq R_{1i}$, said inner cladding layer having a constant refractive index $n_{2i}$ such that $n_{2i} = n_{1i}$ and $n_{2i} > n_{trenchi}$.

11. The optical link according to claim 1, wherein, for at least one of said fibers i∈[[1;N]] in said optical link, said optical core has a minimal refractive index that equals $n_{Cli}$, said optical cladding also comprises an inner cladding layer directly surrounding said optical core, with an inner radius $R_{1i}$ and an outer radius $R_{2i} \geq R_{1i}$, said inner cladding layer being an extension of said single graded-index profile of said optical core, and said inner cladding layer has a minimal refractive index $n_{1i} = n_{trenchi}$.

12. An optical system comprising the optical link of claim 1.

* * * * *